United States Patent
Kim et al.

(10) Patent No.: US 8,817,692 B2
(45) Date of Patent: Aug. 26, 2014

(54) METHOD AND APPARATUS FOR ALLOCATING RESOURCES IN A WIRELESS COMMUNICATION SYSTEM

(75) Inventors: Hak Seong Kim, Anyang-si (KR); Han Byul Seo, Anyang-si (KR); Ki Jun Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 56 days.

(21) Appl. No.: 13/574,979

(22) PCT Filed: Jan. 26, 2011

(86) PCT No.: PCT/KR2011/000549
§ 371 (c)(1),
(2), (4) Date: Jul. 24, 2012

(87) PCT Pub. No.: WO2011/093644
PCT Pub. Date: Aug. 4, 2011

(65) Prior Publication Data
US 2012/0287848 A1    Nov. 15, 2012

Related U.S. Application Data

(60) Provisional application No. 61/298,215, filed on Jan. 26, 2010.

(30) Foreign Application Priority Data

Jan. 26, 2011    (KR) .................. 10-2011-0007705

(51) Int. Cl.
*H04B 7/14*    (2006.01)

(52) U.S. Cl.
USPC ........... 370/315; 370/328; 370/210; 370/208; 455/11.1

(58) Field of Classification Search
USPC ................. 370/328, 315, 210, 208
See application file for complete search history.

(56) References Cited

U.S. PATENT DOCUMENTS

| 8,340,676 | B2 * | 12/2012 | Nory et al. | 455/450 |
| 2011/0103292 | A1 * | 5/2011 | Pasad et al. | 370/315 |
| 2013/0064099 | A1 * | 3/2013 | Kim et al. | 370/241 |

FOREIGN PATENT DOCUMENTS

| CN | 101039297 A | 9/2007 |
| CN | 101043495 A | 9/2007 |
| KR | 10-2007-0038875 A | 4/2007 |
| KR | 10-2008-0028264 A | 3/2008 |
| WO | WO 2007/131413 A1 | 11/2007 |

OTHER PUBLICATIONS

3GPP TSG RAN WG1 #58, R1-093448, "Common R-PDCCH Design for Backhaul Control in Type I Relay", LG-Nortel, Shenzhen, China, Aug. 24-28, 2009.

* cited by examiner

*Primary Examiner* — Duc C Ho
(74) *Attorney, Agent, or Firm* — Birch, Stewart, Kolasch & Birch, LLP

(57) ABSTRACT

A method and apparatus for allocating backhaul resources to a relay in a wireless communication system, particularly a method and apparatus for processing a downlink signal at a relay in a wireless communication system are discussed. The method in one embodiment includes receiving resource allocation information indicating a resource block set from a Base Station (BS) through higher layer signaling, receiving a downlink subframe, starting from a predetermined Orthogonal Frequency Division Multiplexing (OFDM) symbol, from the BS, monitoring the resource block set in the downlink subframe to receive a physical control channel, and performing an operation according to the received physical control channel.

20 Claims, 17 Drawing Sheets

METHOD AND APPARATUS FOR ALLOCATING RESOURCES IN A WIRELESS COMMUNICATION SYSTEM

CROSS-REFERENCE TO RELATED APPLICATIONS

This non-provisional application is a 371 of International Application No. PCT/KR2011/000549, filed on Jan. 26, 2011, which claims the benefit of U.S. Provisional Application No. 61/298,215 filed on Jan. 26, 2010; and claims benefit to Foreign Application No. 10-2011-0007705, filed in the Republic of Korea on Jan. 26, 2011. The entirety of each of the above-identified applications is expressly incorporated herein by reference.

TECHNICAL FIELD

The present invention relates to a wireless communication system, and more particularly, to a method and apparatus for allocating resources for a physical channel to a relay.

BACKGROUND ART

Extensive research has been conducted to provide various types of communication services including voice and data services in wireless communication systems. In general, a wireless communication system is a multiple access system that supports communication with multiple users by sharing available system resources (e.g. a bandwidth, transmission power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Multi Carrier Frequency Division Multiple Access (MC-FDMA).

DISCLOSURE

Technical Problem

An object of the present invention devised to solve the problem lies on a method and apparatus for efficiently allocating resources for a physical channel in a wireless communication system, particularly a relay system.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for processing a downlink signal at a relay in a wireless communication system, including receiving resource allocation information indicating a resource block set from a BS through higher layer signaling, receiving a downlink subframe, starting from a specific Orthogonal Frequency Division Multiplexing (OFDM) symbol, from the BS, monitoring the resource block set in the downlink subframe to receive a physical control channel, and performing an operation according to the received physical control channel.

In another aspect of the present invention, provided herein is a relay used in a wireless communication system, including a Radio Frequency (RF) unit, and a processor. The processor is configured to receive resource allocation information indicating a resource block set from a BS through higher layer signaling, to receive a downlink subframe, starting from a specific OFDM symbol, from the BS, monitors the resource block set in the downlink subframe to receive a physical control channel, and to perform an operation according to the received physical control channel.

The resource block set may include a Virtual Resource Block (VRB) set.

The VRB set may include a plurality of distributed VRB sets.

The resource block set may include a resource block set of a first slot and a resource block set of a second slot, and the resource block set of the first slot may be identical to the resource block set of the second slot.

The resource allocation information may include a header and allocation information, wherein the header indicates a resource allocation type, and wherein the allocation information includes a bit map indicating resource blocks, a single bit of the bit map indicating a resource block or a resource block group in accordance with the resource allocation type.

The resource allocation information may include a resource indication value (RIV), the RIV being corresponding to a start resource block and a length of allocated resource blocks.

The higher layer signaling may be a radio resource control (RRC) signaling

The resource block set may include a plurality of physical control channel candidates and a physical control channel indicated to the relay may be masked by a Radio Network Temporary Identity (RNTI) related with the relay.

The downlink subframe may be received from $3^{rd}$ OFDM symbol.

In another aspect of the present invention, provided herein is a method for processing a downlink signal at a relay in a wireless communication system, including receiving resource allocation information indicating a Virtual Resource Block (VRB) set, receiving a downlink subframe including a plurality of physical resource blocks (PRBs), starting from a specific Orthogonal Frequency Division Multiplexing (OFDM) symbol, from the BS; and performing an operation for receiving a physical control channel within the VRB set. VRBs within the VRB set are distributed mapped to the plurality of PRBs.

In a further aspect of the present invention, provided herein is a relay used in a wireless communication system, including a Radio Frequency (RF) unit, and a processor. The processor is configured to receive resource allocation information indicating a Virtual Resource Block (VRB) set, to receive a downlink subframe including a plurality of physical resource blocks (PRBs), starting from a specific Orthogonal Frequency Division Multiplexing (OFDM) symbol, from the BS, and to perform an operation for receiving a physical control channel within the VRB set. VRBs within the VRB set are distributed mapped to the plurality of PRBs.

The physical control channel may be received on one or more resource blocks without interleaving.

The VRBs within the VRB set may be distributed mapped to PRBs of 1st slot and PRBs of 2nd slot in a same pattern The VRB set may include a plurality of distributed VRB sets.

The VRB set may include a VRB set of a first slot and a VRB set of a second slot, and the VRB set of the first slot is identical to the VRB set of the second slot.

The VRB set may include a plurality of physical control channel candidates, and a physical control channel indicated to the relay is masked by a Radio Network Temporary Identity (RNTI) related with the relay.

The downlink subframe may be received from $3^{rd}$ OFDM symbol.

In a further aspect of the present invention, provided herein is a method for processing a downlink signal at a relay in a wireless communication system, including receiving a physical control channel including resource allocation information, and performing an operation for receiving a physical shared channel by using the resource allocation information. If resources indicated by the resource allocation information include a resource block carrying the physical control channel, a first slot of the resource block carrying the physical control channel is excluded from the operation for receiving the physical shared channel.

In a further aspect of the present invention, provided herein is a relay used in a wireless communication system, including an RF unit and a processor. The processor is configured to receive a physical control channel including resource allocation information, and to perform an operation for receiving a physical shared channel by using to the resource allocation information. If resources indicated by the resource allocation information include a resource block carrying the physical control channel, a first slot of the resource block carrying the physical control channel is excluded from the operation for receiving the physical shared channel.

The physical control channel may include a Relay Physical Downlink Control channel (R-PDCCH) and the physical shared channel may include a Relay Physical Downlink Shared Channel (R-PDCCH).

The resource block may include a Physical Resource Block (PRB).

The physical control channel may be interleaved in a plurality of resource blocks.

If the resources indicated by the resource allocation information include a resource block carrying a part of the physical control channel, a first slot of the resource block carrying the part of the physical control channel may be excluded from the operation for receiving the physical shared channel.

Advantageous Effects

In accordance with embodiments of the present invention, resources can be efficiently allocated to a physical channel in a wireless communication system, particularly a relay system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings. Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Multi Carrier Frequency Division Multiple Access (MC-FDMA). CDMA can be implemented as a wireless technology such as Universal Terrestrial Radio Access (UTRA) or CDMA2000. TDMA can be implemented as a wireless technology such as Global System for Mobile communications (GSM)/General Packet Radio Service (GPRS)/Enhanced Data Rates for GSM Evolution (EDGE). OFDMA can be implemented as a wireless technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA. LTE-Advanced (LTE-A) is an evolution of 3GPP LTE.

While the following description is given of embodiments of the present invention with the appreciation that the technical features of the present invention are applied to a 3GPP system, this is purely exemplary and thus should not be construed as limiting the present invention.

Figure 1:
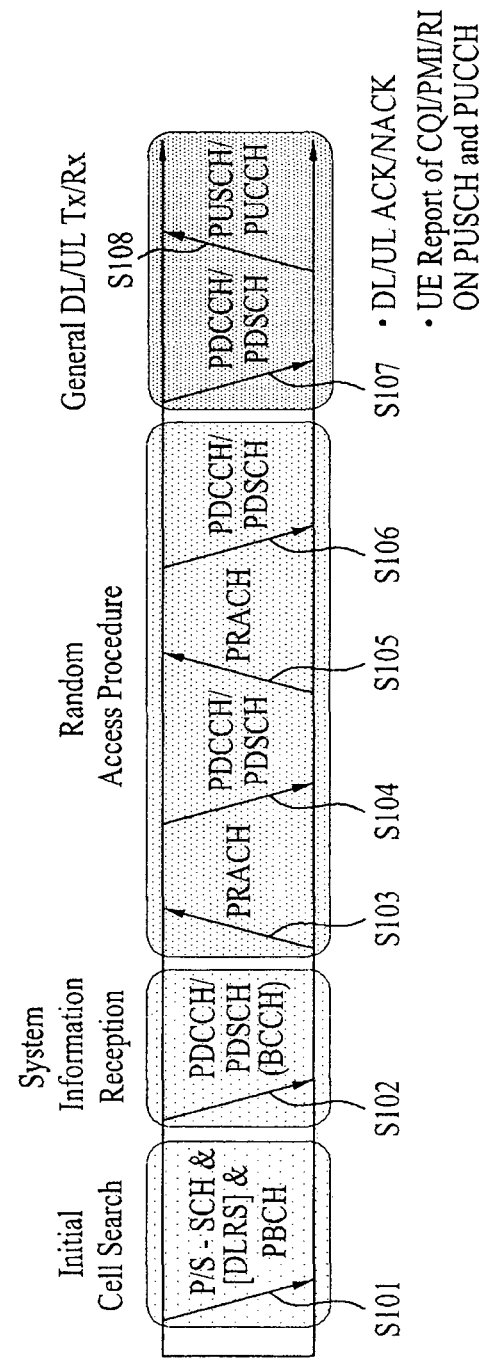
FIG. 1 illustrates physical channels and signal transmission on the physical channels in a $3^{rd}$ Generation Partnership Project (3GPP) system.

FIG. 1 illustrates physical channels and signal transmission on the physical channels in a 3GPP LTE system.

Referring to FIG. 1, when a User Equipment (UE) is powered on or enters a new cell, the UE performs an initial cell search involving acquisition of synchronization with a Base Station (BS) (S101). For the initial cell search, the UE receives a Primary Synchronization CHannel (P-SCH) and a Secondary Synchronization CHannel (S-SCH), and acquires synchronization with the BS and information such as a cell Identity (ID) from the P-SCH and the S-SCH. Then the UE may receive a Physical Broadcast CHannel (PBCH) from the BS and acquire broadcast information within a cell from the PBCH.

Upon completion of the initial cell search, the UE may acquire more specific system information by receiving a Physical Downlink Control CHannel (PDCCH) and receiving a Physical Downlink Shared CHannel (PDSCH) according to information carried on the PDCCH (S102).

Meanwhile, if the UE initially accesses the BS or has no radio resources for signal transmission, the UE may perform a Random Access (RA) procedure (S103 to S106). For the RA procedure, the UE may transmit a predefined sequence as a preamble on a Physical Random Access CHannel (PRACH) (S103 and S105) and receive a response message to the preamble on a PDSCH (S104 and S106). If the RA procedure is contention-based, the UE may additionally perform a contention resolution procedure.

After the above RA procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE receives from the BS on a downlink or transmits to the BS on an uplink includes a downlink/uplink ACKnowledgment/Negative ACKnowledgment (ACK/NACK) signal, a Channel Quality Indicator (CQI), a Scheduling Request (SR), a Precoding Matrix Index (PMI), and a Rank Indicator (RI). In the 3GPP LTE system, the UE may transmit control information such as a CQI, a PMI and an RI on a PUSCH and/or a PUCCH.

Figure 2:
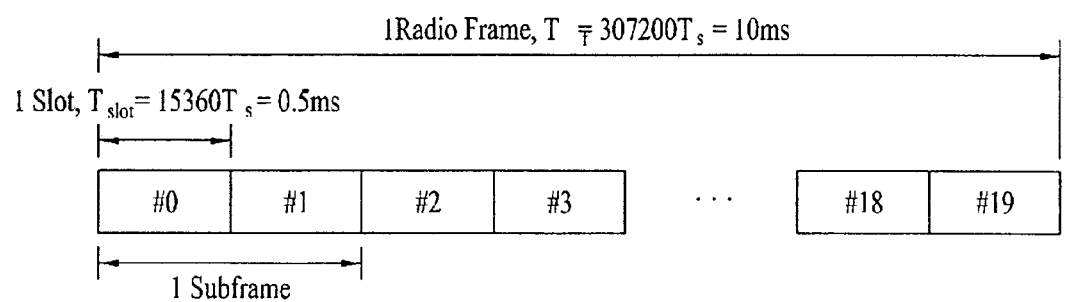
FIG. 2 illustrates a radio frame structure in the 3GPP system.

FIG. 2 illustrates a radio frame structure in the 3GPP system.

Referring to FIG. 2, a radio frame is 10 ms (307,200 $T_s$) in duration. The radio subframe is divided into 10 subframes, each subframe being 1 ms long. Each subframe is further divided into two slots, each of 0.5 ms (15,360 $T_s$) duration. $T_s$ represents a sampling time and is given as $T_s=1/(15 \text{ kHz} \times 2048)=3.2552 \times 10^{-8}$ (about 33 ns). A slot is defined by a plurality of Orthogonal Frequency Division Multiplexing (OFDM) symbols in time by a plurality of Resource Blocks (RBs) in frequency. One RB has 12 subcarriers by 7 (6) OFDM symbols in the 3GPP LTE system. A unit time in which data is transmitted, known as Transmission Time Interval (TTI) may be defined as one or more subframes. This radio frame structure is purely exemplary and thus the number of subframes, the number of slots, or the number of OFDM symbols in a radio frame may vary.

Figure 3:
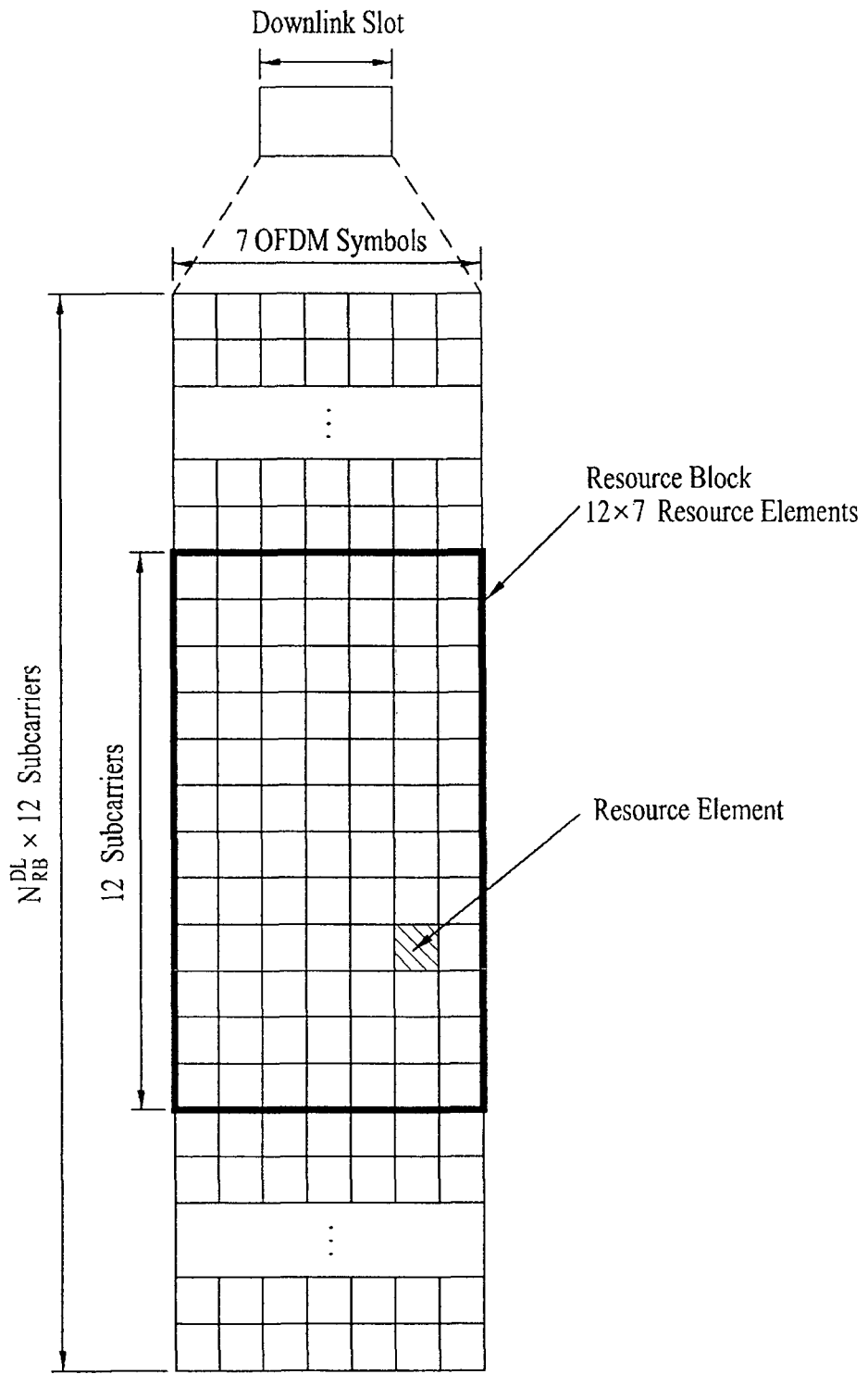
FIG. 3 illustrates the structure of a downlink resource grid for the duration of one downlink slot.

FIG. 3 illustrates the structure of a downlink resource grid for the duration of one downlink slot.

Referring to FIG. 3, a downlink slot includes 7 (or 6) OFDM symbols in time by $N^{DL}_{RB}$ RBs in frequency. Because each RB has 12 subcarriers, the downlink slot includes $N^{DL}_{RB} \times 12$ subcarriers in frequency. In the illustrated case of FIG. 3, the downlink slot has 7 OFDM symbols and each RB includes 12 subcarriers, which does not limit the scope and spirit of the present invention. For example, the number of OFDM symbols per downlink slot depends on the length of a Cyclic Prefix (CP). Each element in the resource grid is referred to as a Resource Element (RE). An RE is a minimum time/frequency resource defined for a physical channel, indicated by one OFDM symbol index and one subcarrier index. Each RB includes $N_{symb}^{DL} \times N_{Sc}^{RB}$ REs where $N_{symb}^{DL}$ represents the number of OFDM symbols per downlink slot and $N_{sc}^{RB}$ represents the number of subcarriers per RB. The number of RBs per downlink slot, $N^{DL}_{RB}$ depends on a downlink transmission bandwidth set by a cell.

Figure 4:
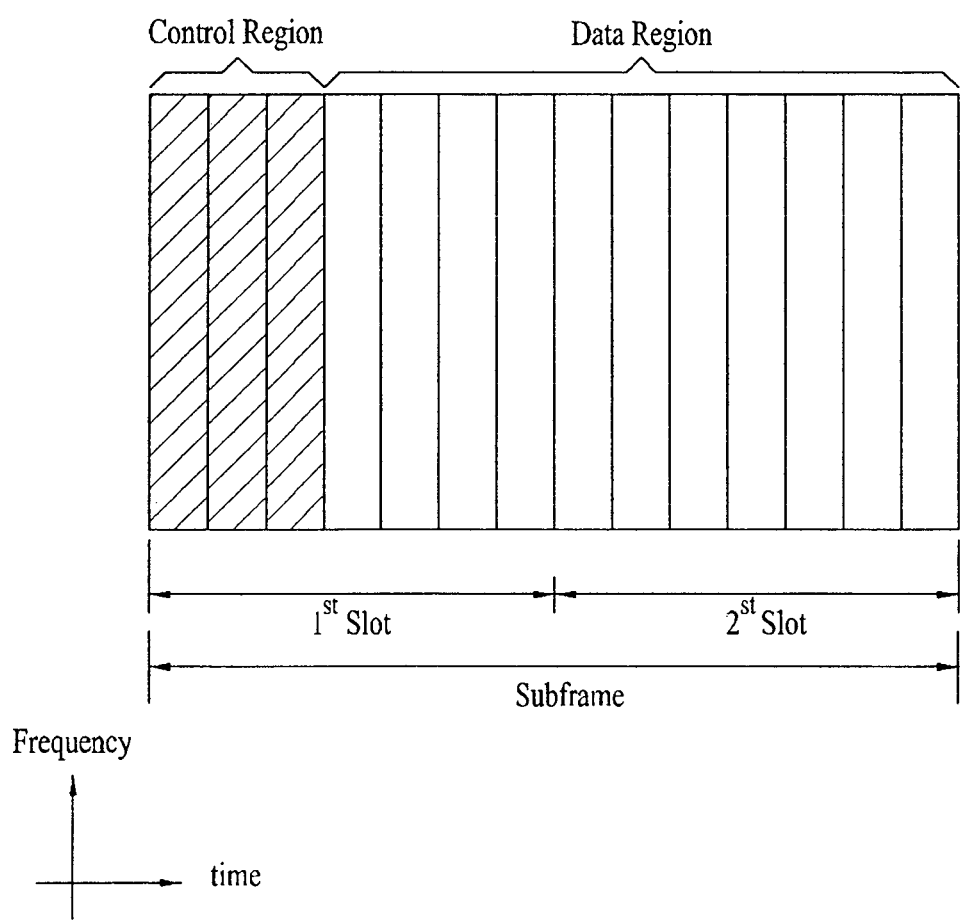
FIG. 4 illustrates a downlink subframe structure in the 3GPP system.

FIG. 4 illustrates a downlink subframe structure in the 3GPP system.

Referring to FIG. 4, a downlink subframe includes a plurality of (e.g. 12 or 14) OFDM symbols. A plurality of OFDM symbols at the start of the downlink subframe are used for a control region and the other OFDM symbols of the downlink subframe are used for a data region. The size of the control region may be determined independently for each subframe. The control region carries scheduling information and other Layer 1/Layer 2 (L1/L2) control information, whereas the data region carries data. Control channels include a Physical Control Format Indicator CHannel (PCFICH), a Physical Hybrid automatic repeat request (ARQ) Indicator CHannel (PHICH), and a Physical Downlink Control CHannel (PDCCH). Traffic channels include a Physical Downlink Shared CHannel (PDSCH).

The PDCCH delivers information related to resource allocation for transport channels, a Paging CHannel (PCH) and a Downlink Shared CHannel (DL-SCH), an uplink scheduling grant, and HARQ information to each UE or each UE group. The PCH and the DL-SCH are delivered on the PDSCH. Therefore, a BS and a UE transmit and receive data on the PDSCH except for predetermined control information or predetermined service data. Control information carried on the PDCCH is called Downlink Control Information (DCI). The DCI transports uplink resource allocation information, downlink resource allocation information, or uplink transmission power control commands for UE groups. Table 1 below illustrates DCI formats according to the contents of DCI.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing, mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 conveys uplink resource allocation information, DCI format 1 to DCI format 2A are used to indicate downlink resource allocation information, and DCI format 3 and DCI format 3A indicate Transmit Power Control (TPC) commands for UE groups. The BS determines a PDCCH format according to DCI for a UE and adds a Cyclic Redundancy Check (CRC) to control information. The CRC is masked by a unique ID such as a Radio Network Temporary Identifier (RNTI) according to the owner or purpose of the PDCCH.

Figure 5:
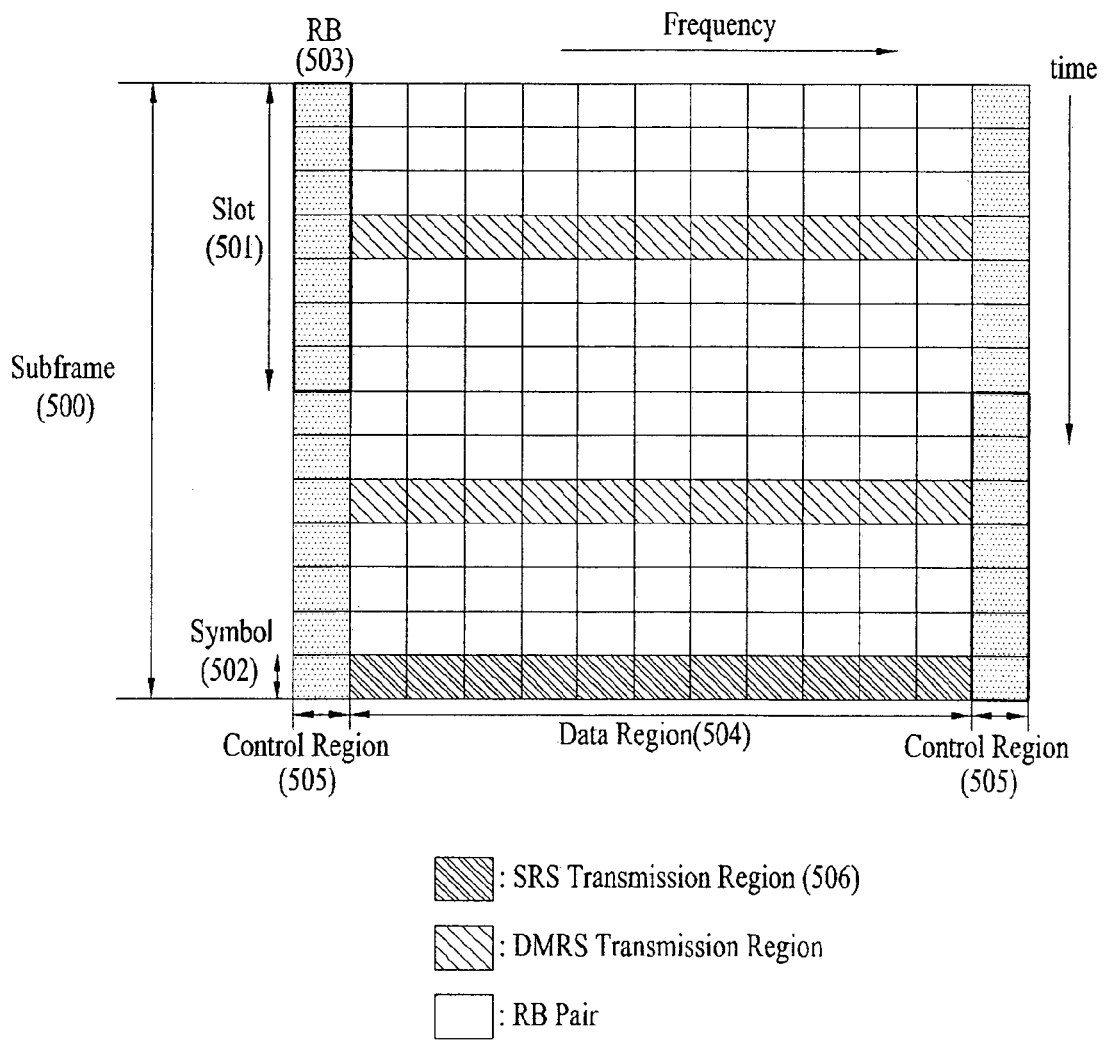
FIG. 5 illustrates an uplink subframe structure in the 3GPP system.

FIG. 5 illustrates an uplink subframe structure in the 3GPP system.

Referring to FIG. 5, a basic unit for LTE uplink transmission, a 1-ms subframe 500 includes two 0.5-ms slots 501. On the assumption of a normal CP, each slot has 7 symbols 502, each symbol being an SC-FDMA symbol. An RB 503 is a resource allocation unit defined by 12 subcarriers in frequency by one slot in time. The LTE uplink subframe is largely divided into a data region 504 and a control region 505. The data region 504 refers to communication resources used to transmit data such as voice data and packets, including a Physical Uplink Shared CHannel (PUSCH). The control region 505 refers to communication resources used for each UE to transmit a downlink channel quality report, an ACK/NACK for a received downlink signal, and an uplink scheduling request, including a Physical Uplink Control CHannel (PUCCH). A Sounding Reference Signal (SRS) is transmitted in the last SC-FDMA symbol of a subframe in the time domain and in a data transmission band in the frequency domain. SRSs transmitted in the last SC-FDMA symbol of the same subframe from a plurality of UEs can be distinguished by their frequency positions/sequences.

Now a description will be given of RB mapping. Physical Resource Blocks (PRBs) and Virtual Resource Block (VRBs) are defined. PRBs are configured as illustrated in FIG. 3. Specifically, a PRB is a set of contiguous OFDM symbols by $N_{sc}^{RB}$ contiguous subcarriers. PRBs are numbered from 0 to $N_{RB}^{DL}-1$ in the frequency domain. The relationship between a PRB number $n_{PRB}$ and REs (k,l) in a slot is given by $$n_{PRB} = \left\lfloor \frac{k}{N_{sc}^{RB}} \right\rfloor \quad \text{[Equation 1]}$$

where k denotes a subcarrier index and $N_{sc}^{RB}$ denotes the number of subcarriers in an RB.

A VRB is equal in size to a PRB. Two types of VRBs are defined, Localized VRBs (LVRBs) and Distributed VRBs (DVRBs). Irrespective of a VRB type, a pair of VRBs with the same VRB number $n_{VRB}$ are mapped to two RBs in the two slots of a subframe.

Figure 6:
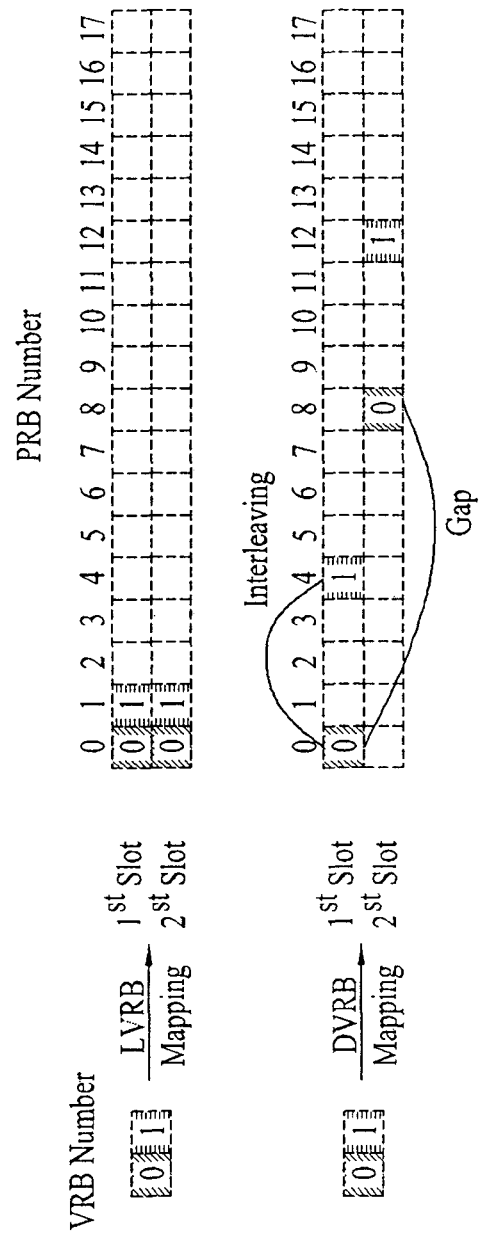
FIG. 6 illustrates a method for mapping Virtual Resource Blocks (VRBs) to Physical Resource Blocks (PRBs).

FIG. 6 illustrates a method for mapping VRBs to PRBs.

Referring to FIG. 6, LVRBs are mapped directly to PRBs such that the numbers of the LVRBs, $n_{VRB}$ is identical to the numbers of the PRBs, $n_{PRB}$ ($n_{VRB}=n_{PRB}$). VRBs are numbered from 0 to $N_{VRB}^{DL}-1$ and $N_{VRB}^{DL}=N_{RB}^{DL}$. In contrast, DVRBs are mapped to PRBs after interleaving. More specifically, a DVRB may be mapped to a PRB as illustrated in Table 2. Table 2 lists RB gaps.

TABLE 2

| System BW ($N_{RB}^{DL}$) | Gap ($N_{gap}$) | |
|---|---|---|
| | 1st Gap ($N_{gap,1}$) | 2nd Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |

TABLE 2-continued

| System BW ($N_{RB}^{DL}$) | Gap ($N_{gap}$) | |
|---|---|---|
| | 1st Gap ($N_{gap,1}$) | 2nd Gap ($N_{gap,2}$) |
| 45-49 | 27 | N/A |
| 50-63 | 27 | 9 |
| 64-79 | 32 | 16 |
| 80-110 | 48 | 16 |

$N_{gap}$ denotes the frequency spacing between PRBs in the first and second slots of a subframe, to which VRBs with the same VRB number are mapped. The frequency spacing may be expressed as the number of PRBs. If $6 \leq N_{RB}^{DL} \leq 49$, only one gap is defined ($N_{gap}=N_{gap,1}$). If $50 \leq N_{RB}^{DL} \leq 110$, two gaps $N_{gap,1}$ and $N_{gap,2}$ are defined. $N_{gap}=N_{gap,1}$ or $N_{gap}=N_{gap,2}$ is signaled through downlink scheduling. DVRBs are numbered from 0 to $N_{VRB}^{DL}-1$. If $N_{gap}=N_{gap,1}$, $N_{VRB}^{DL}=N_{VRB,gap1}^{DL}=2 \cdot \min(N_{gap}, N_{RB}^{DL}-N_{gap})$. If $N_{gap}=N_{gap,2}$, $N_{VRB}^{DL}=N_{VRB,gap2}^{DL}=\lfloor N_{RB}^{DL}/2N_{gap} \rfloor \cdot 2N_{gap}$. min(A, B) represents the smaller value between A and B.

$\tilde{N}_{RB}^{DL}$ consecutive VRB numbers form a VRB number interleaving unit. If $N_{gap}=N_{gap,1}$, $\tilde{N}_{VRB}^{DL}=N_{VRB}^{DL}$. If $N_{gap}=N_{gap,2}$, $\tilde{N}_{VRB}^{DL}=2N_{gap}$. VRB number interleaving may be performed using four columns and $N_{row}$ rows in each interleaving unit. Thus, $N_{row}=\lceil \tilde{N}_{VRB}^{DL}/(4P) \rceil \cdot P$ where P denotes the size of a Resource Block Group (RBG). An RBG is defined as P consecutive RBs. VRB numbers are written in a matrix row by row and read from the matrix column by column. $N_{null}$ nulls are inserted into the last $N_{null}/2$ rows of the second and fourth columns, and $N_{null}=4N_{row}-\tilde{N}_{VRB}^{DL}$. The nulls are neglected during reading.

Figure 7:
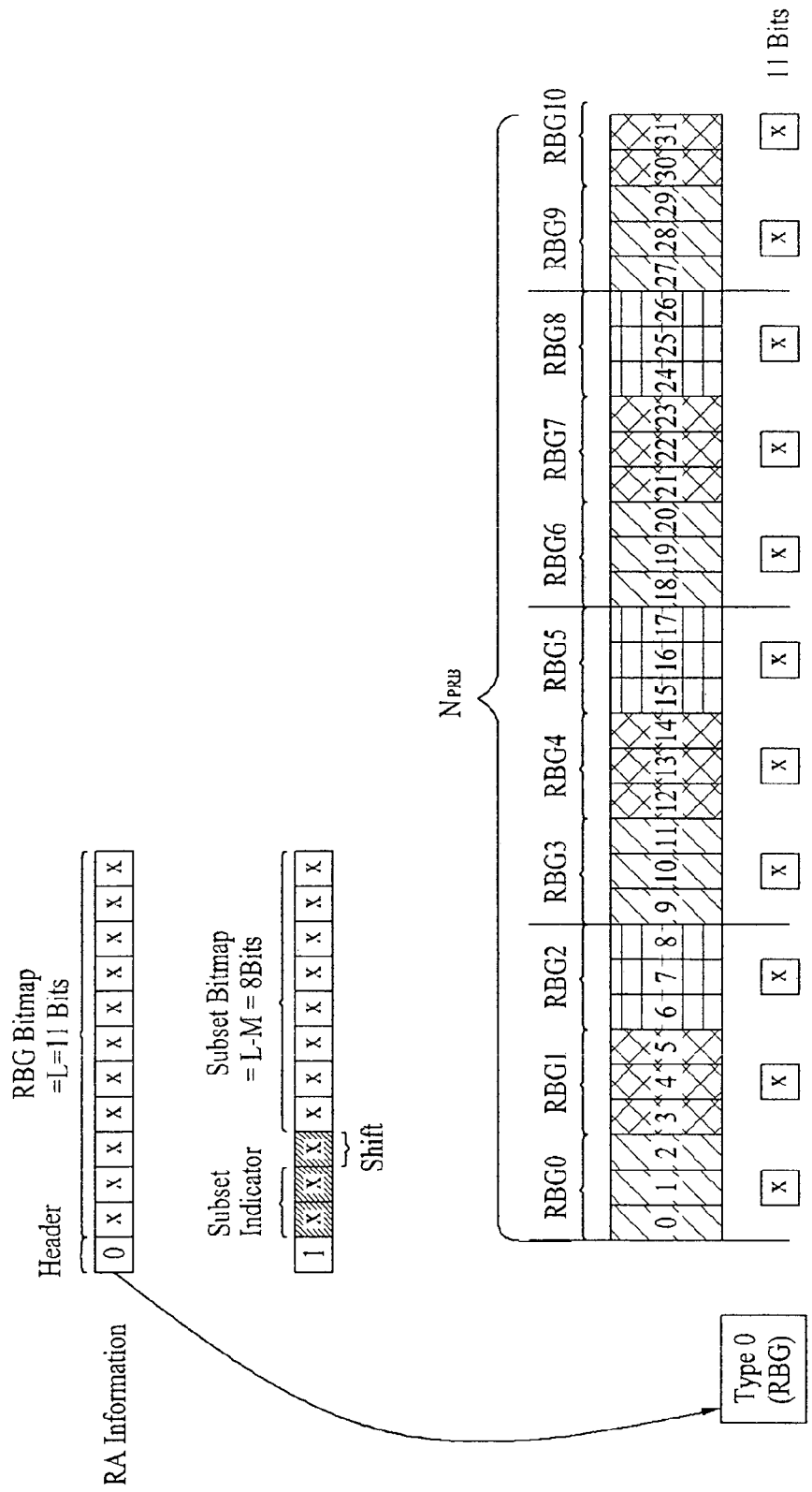
FIGS. 7, 8 and 9 illustrate Resource Allocation (RA) of type 0, RA of type 1 and RA of type 2, respectively.
Figure 8:
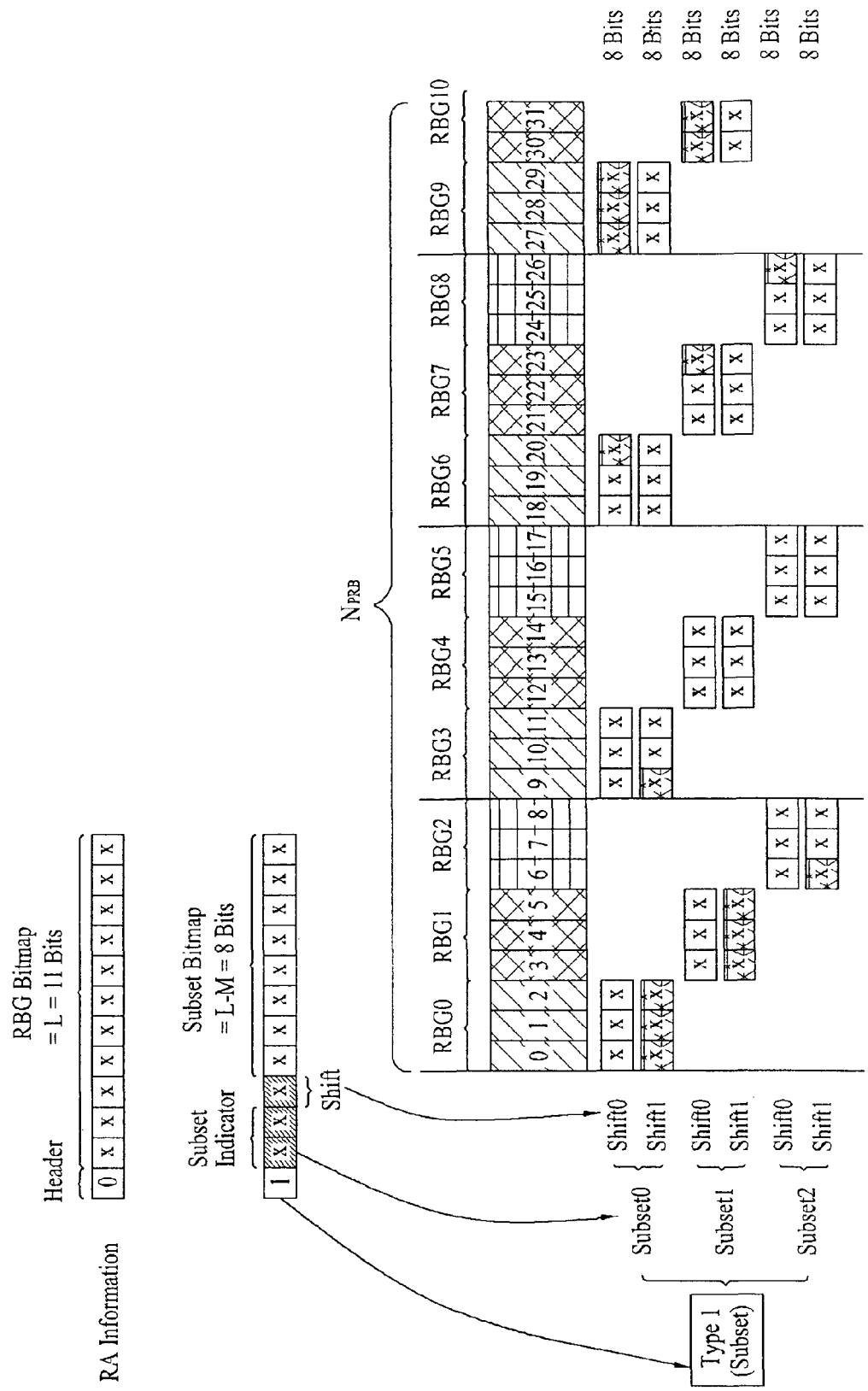
Figure 9:
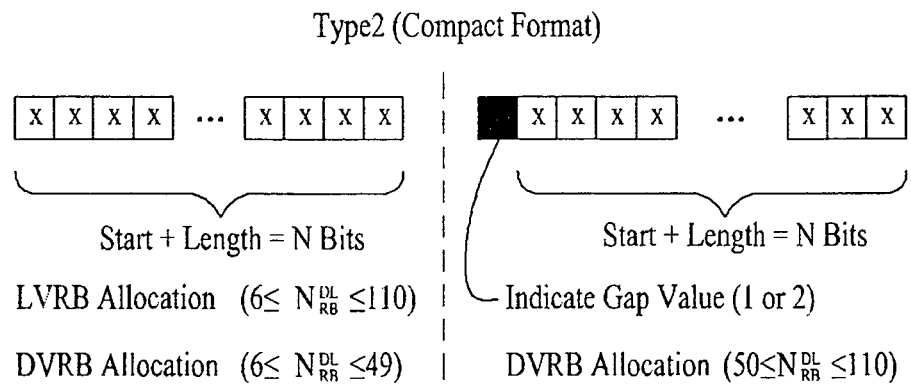

Conventional LTE resource allocations will be described below. FIGS. 7, 8 and 9 illustrate control information formats for Resource Allocation (RA) of type 0, RA of type 1 and RA of type 2 and examples of resource allocation according to the control information formats.

A UE interprets an RA field according to a detected PDCCH DCI format. The RA field of each PDCCH includes two parts, an RA header field and actual RB allocation information. PDCCH DCI format 1, PDCCH DCI format 2, and PDCCH DCI format 2A are the same in format for RA of type 0 and type 1, and distinguished from one another by their 1-bit RA header fields according to a downlink system band. Specifically, type-0 RA and type-1 RA are indicated by 0 and 1, respectively. While PDCCH DCI format 1, PDCCH DCI format 2, and PDCCH DCI format 2A are used for type-0 RA or type-1 RA, PDCCH DCI format 1A, PDCCH DCI format 1B, PDCCH DCI format 1C, and PDCCH DCI format 1D are used for type-2 RA. A PDCCH DCI format for type-2 RA does not have an RA header field. Resource allocation field indicates a PRB set of 1st slot. As will be explained below, in case of resource allocation type 0, 1, 2-LVRB, since there is no slot hopping between 1st slot and 2nd slot, the same PRB set is allocated in 2nd slot as allocated in $1^{st}$ slot (i.e., PRB index (1st slot)=PRB index (2nd slot). Meanwhile, in case of resource allocation type 2-DVRB, if a PRB set of 1st slot is given, a PRB set of 2nd slot is determined using a slot hopping rule.

Referring to FIG. 7, in RA of type 0, RB allocation information includes a bitmap indicating RBGs allocated to a scheduled UE. An RBG is a set of consecutive PRBs. The size of an RBG, P depends on a system bandwidth as illustrated in Table 3 below.

TABLE 3

| System Bandwidth $N_{RB}^{DL}$ | RBG Size (P) |
|---|---|
| ≤10 | 1 |
| 11-26 | 2 |
| 27-63 | 3 |
| 64-110 | 4 |

The total number of RBGs, $N_{RBG}$ for a downlink system bandwidth of $N_{RB}^{DL}$ PRBs is given by $N_{RBG}\lceil N_{RB}^{DL}/P \rceil$. Each of the $\lfloor N_{RB}^{DL}/P \rfloor$ RBGs is of size P and if $N_{RB}^{DL}$ mod P>0, one of the RBGs has a size of $N_{RB}^{DL}-P\cdot\lfloor N_{RB}^{DL}/P \rfloor$. Herein, mod represents a modulo operation, $\lceil \ \rceil$ represents a ceiling function, and $\lfloor \ \rfloor$ represents a flooring function. The size of the bitmap is $N_{RBG}$ and each bit of the bitmap corresponds to one RBG. The RBGs are indexed from 0 to $N_{RBG}-1$ in an ascending order of frequency. RBG 0 to RBG $N_{RBG}-1$ are sequentially mapped to the Most Significant Bit (MSB) to the Least Significant Bit (LSB) of the bitmap.

Referring to FIG. 8, in RA of type 1, RB allocation information of size $N_{RBG}$ indicates resources of an RBG subset on a PRB basis to a scheduled UE. An RBG subset p (0≤p<P) includes every $P^{th}$ RBG, starting from RBG p. The RB allocation information has three fields. The first field with $\lceil \log_2(P) \rceil$ indicates an RBG subset selected from among P RBG subsets. The second field with one bit indicates a shift of a resource allocation span within the RGB subset. If the bit value is 1, this means that the shift is triggered and if the bit is 0, this means that the shift is not triggered. The third field includes a bitmap in which each bit addresses a single PRB in the selected RBG subset. The part of the bitmap used to address PRBs in the selected RBG subset has size $N_{RB}^{TYPE1}$ and is defined as $$N_{RB}^{TYPE1}=\lceil N_{RB}^{DL}/P \rceil-\lceil \log_2(P) \rceil-1 \quad \text{[Equation 2]}$$

The addressable PRB numbers of the selected RBG subset start from an offset, $\Delta_{shift}(p)$ to the smallest PRB number within the selected RBG subset, which is mapped to the MSB of the bitmap. The offset is expressed as the number of PRBs and applied within the selected RBG subset. If the bit value of the second field for shift of a resource allocation span is set to 0, the offset for the RGB subset p is given by $\Delta_{shift}(p)=0$. Otherwise, the offset for the RGB subset p is given by $\Delta_{shift}(p)=N_{RB}^{RBG\ subset}(p)-N_{RB}^{TYPE1}$. $N_{RB}^{RBG\ subset}(p)$ is the number of PRBs in the RGB subset p and is computed by $$N_{RB}^{RBG\ subset}(p) = \begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1)\bmod P + 1, & p = \left\lfloor \frac{N_{RB}^{DL}-1}{P} \right\rfloor \bmod P \\ \left\lfloor \frac{N_{RB}^{DL}-1}{P^2} \right\rfloor \cdot P, & p > \left\lfloor \frac{N_{RB}^{DL}-1}{P} \right\rfloor \bmod P \end{cases} \quad \text{[Equation 3]}$$

Referring to FIG. 9, in RA of type 2, RB allocation information indicates a set of contiguously allocated LVRBs or DVRBs to a scheduled UE. In case of RA signaled in PDCCH DCI format 1A, 1B or 1D, a 1-bit flag indicates whether LVRBs or DVRBs are allocated. For instance, if the flag is set to 0, this indicates LVRB allocation and if the flag is set to 1, this indicates DVRB allocation. On the other hand, if RA is signaled in PDCCH DCI format 1C, DVRBs are always allocated. A type-2 RA field includes a Resource Indication Value (RIV), wherein the RIV is corresponding to a start resource block $RB_{start}$ and a length. The length represents the number of virtually contiguously allocated RBs.

Figure 10:
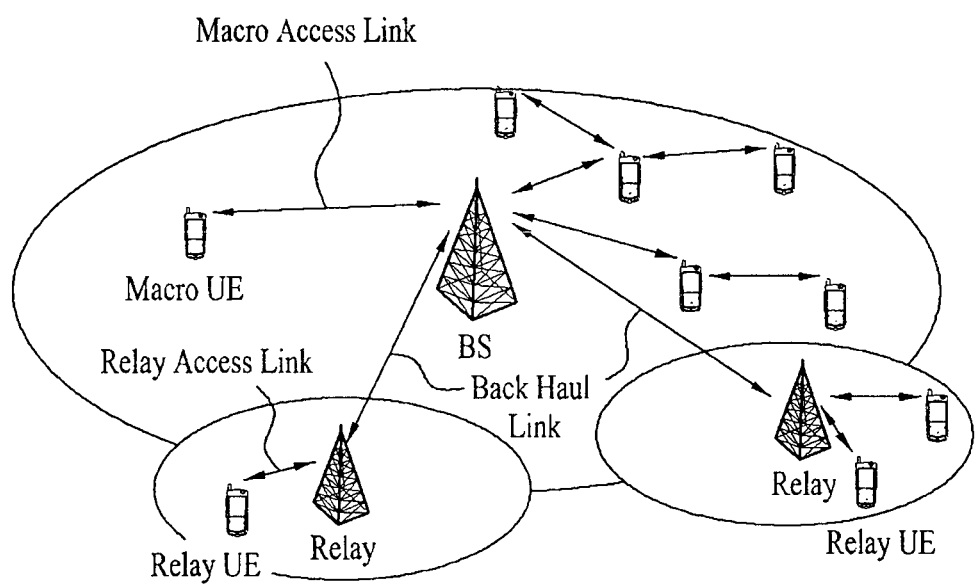
FIG. 10 illustrates a wireless communication system having relays.

FIG. 10 illustrates a wireless communication system having relays. A relay or Relay Node (RN) extends the service area of a BS or is installed in a shadowing area to thereby provide a reliable service. Referring to FIG. 10, the wireless communication system includes a BS, relays, and UEs. The UEs communicate with the BS or the relays. For the sake of convenience, a UE communicating with a BS is referred to as a macro UE and a UE communicating with a relay is referred to as a relay UE. A communication link between a BS and a macro UE and a communication link between a relay and a relay UE are referred to as a macro access link and a relay access link, respectively. A communication link between a BS and a relay is referred to as a backhaul link.

Relays are classified into L1 relays, L2 relays, and L3 relays according to their functionalities in multi-hop transmission. An L1 relay usually functions as a repeater. Thus, the L1 relay simply amplifies a signal received from a BS or a UE and transmits the amplified signal to the UE or the BS. Because the L1 relay does not decode a received signal, the transmission delay of the signal is short. Despite this benefit, noise is also amplified because the L1 relay does not separate the signal from the noise. To avert this problem, an advanced repeater or smart repeater capable of UL power control or self-interference cancellation may be used. The operation of an L2 relay may be depicted as decode-and-forward. The L2 relay can transmit user-plane traffic to L2. While the L2 relay does not amplify noise, decoding increases transmission delay. An L3 relay whose operation is depicted as self-backhauling can transmit an Internet Protocol (IP) packet to L3. As it is equipped with a Radio Resource Control (RRC) function, the L3 layer serves as a small-size BS.

L1 and L2 relays may be regarded as part of a donor cell covered by a BS. In the case where a relay is part of a donor cell, the relay does not have a cell ID of its own cell ID because it cannot control its cell and UEs of the cell. Nonetheless, the relay may still have a relay ID. At least part of Radio Resource Management (RRM) is controlled by the BS to which the donor cell belongs, while parts of the RRM may be located in the relay. An L3 relay can control cells of its own. Then the L3 relay may manage one or more cells and each of the cells may have a unique physical-layer cell ID. The L3 relay may have the same RRM mechanism as a BS. From the perspective of a UE, there is no difference between accessing a cell controlled by the L3 relay and accessing a cell controlled by a normal BS.

Relays may be classified as follows according to mobility.
Fixed RN: as is implied from its appellation, this type RN is permanently fixed for use in a shadowing area or for coverage extension. It may function as a simple repeater.
Nomadic RN: this type RN is temporarily installed when users are rapidly increasing in number, or is movable within a building.

Mobile RN: this RN can be installed in a public transportation vehicle such as a bus or the subway.

The mobility of the RN should be supported.

The following classifications can also be considered according to the links between relays and networks.

In-based connection: a network-to-relay link shares the same frequency band with a network-to-UE link in a donor cell.

Out-band connection: a network-to-relay link and a network-to-UE link use different frequency bands in a donor cell.

With respect to the knowledge of the existence of a relay in a UE, relays are classified into the followings.

Transparent relay: a UE is not aware of whether or not it is communicating with a network via the relay.

Non-transparent relay: a UE is aware of whether or not it is communicating with a network via the relay.

Figure 11:
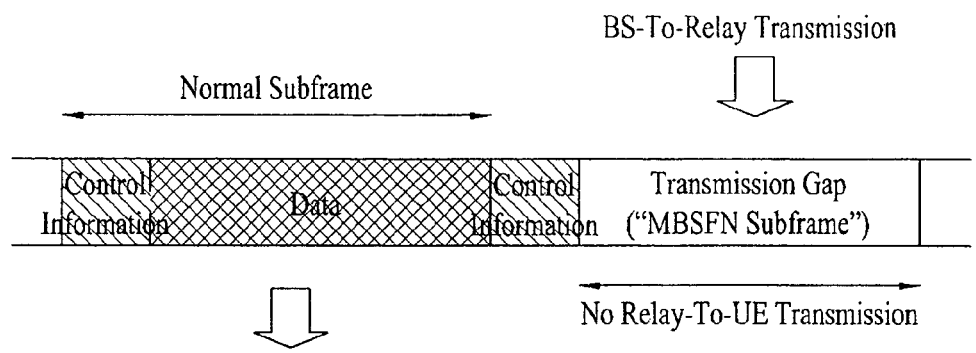
FIG. 11 illustrates backhaul transmission in a Multicast Broadcast Single Frequency Network (MBSFN) subframe.

FIG. 11 illustrates backhaul transmission in a Multicast Broadcast Single Frequency Network (MBSFN) subframe. For in-band relaying, a BS-to-relay link (i.e. a backhaul link) operates in the same frequency band as a relay-to-UE link (i.e. a relay access link). In the case where a relay transmits a signal to a UE while it is receiving a signal from a BS or vice versa, the transmitter and receiver of the relay interfere mutually. Accordingly, simultaneous BS-to-relay and relay-to-UE transmissions on the same frequency resources may be limited. For this purpose, the backhaul link and the relay access link are partitioned in Time Division Multiplexing (TDM). In an LTE-A system, a backhaul link is established in a subframe signaled as an MBSFN subframe to support measurements of legacy LTE UEs located in a relay zone (fake MBSFN). If a subframe is signaled as an MBSFN subframe, a UE receives only the control region of the subframe and thus the relay may configure a backhaul link using the data region of the subframe. Specifically, the MBSFN subframe is used for BS-to-relay transmission (e.g. a Relay PDCCH (R-PDCCH) and a Relay PDSCH (R-PDSCH), starting from the third OFDM symbol of the MBSFN subframe.

Now, a description will be given of a method for allocating and managing resources for an R-PDCCH and an R-PDSCH according to embodiments of the present invention.

An R-PDCCH delivers DCI to a relay. For details of DCI, refer to Table 1. For example, the R-PDCCH may carry downlink scheduling information and uplink scheduling information to the relay. Downlink data for a relay (e.g. backhaul data) is received on an R-PDSCH. A communication procedure on the R-PDCCH and R-PDSCH is performed in the same manner as or in a similar manner to step S102 of FIG. 1. That is, the relay receives an R-PDCCH and receives data/control information on an R-PDSCH indicated by the R-PDCCH. R-PDCCH transmission processing (e.g. channel coding, interleaving, multiplexing, etc.) may be carried out in the same manner as defined by LTE or in a simplified manner of that defined by LTE, when needed. For instance, the R-PDCCH transmission processing may be simplified in view of the nature of relays so that an unnecessary process as used in LTE is omitted.

The relay demodulates the R-PDSCH based on control information acquired from the R-PDCCH. Therefore, it is very important to acquire information about the R-PDCCH accurately. In the legacy LTE system, a PDCCH candidate region (i.e. a PDCCH search space) is reserved in a control region and a PDCCH is transmitted to a specific UE in a part of the PDCCH candidate region. Accordingly, the UE acquires its PDCCH from the PDCCH search space through blind decoding. Similarly, an R-PDCCH may be transmitted to a relay in the whole or part of reserved resources.

Figure 12:
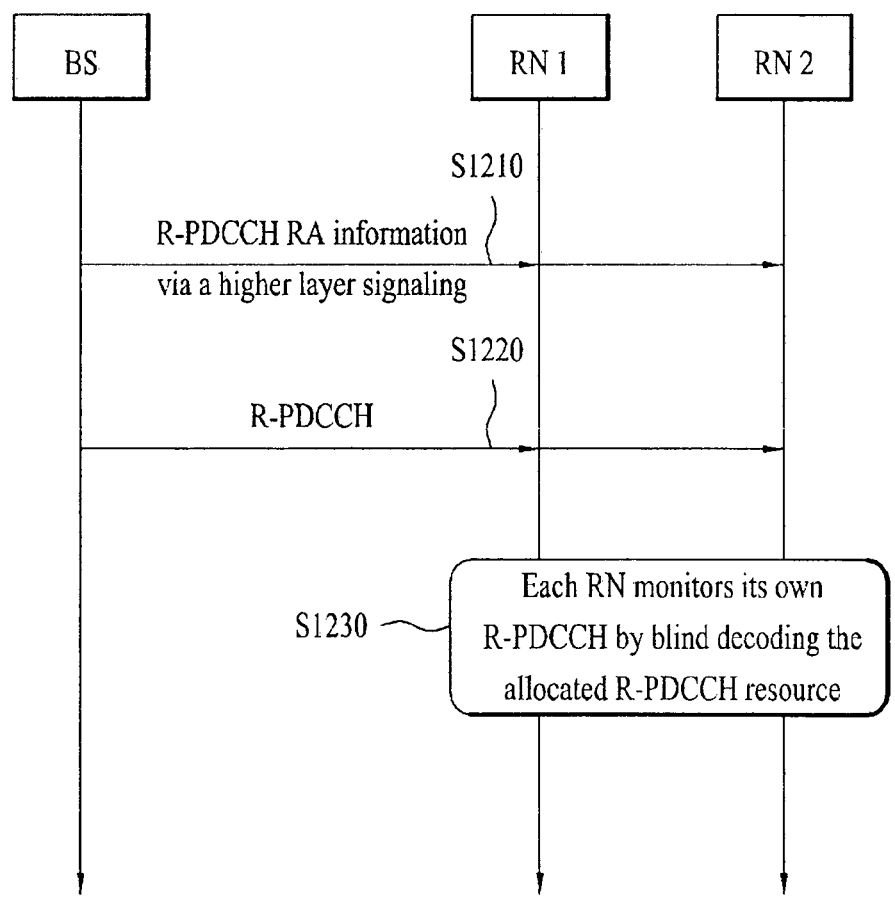
FIG. 12 is a diagram illustrating a signal flow for allocating resources for a Relay Physical Downlink Control CHannel (R-PDCCH) and receiving the R-PDCCH using the allocated resources according to an embodiment of the present invention.

FIG. 12 is a diagram illustrating a signal flow for allocating resources for an R-PDCCH and receiving the R-PDCCH using the allocated resources according to an embodiment of the present invention.

Referring to FIG. 12, a BS transmits R-PDCCH RA information to RNs (S1210). The R-PDCCH RA information is used to reserve an R-PDCCH resource area. Specifically, the R-RPDCCH RA information indicates the positions of resources in which an R-PDCCH is likely to be transmitted to the RNs (a R-PDCCH search space configuration) in advance. For the sake of convenience, the signaling for reserving R-PDCCH resources in step S1210 will be referred to as Signal #1. Signal #1 may be transmitted through higher layer signaling such as RRC signaling, MAC signaling, etc., preferably RRC signaling. In addition, Signal #1 may be transmitted in a semi-static manner. Signal #1 may be cell-specific, relay group-specific, or relay-specific.

The R-PDCCH search space refers to R-PDCCH resources (or an R-PDCCH resource area) that an RN is supposed to monitor to receive its own R-PDCCH. The R-PDCCH search space includes a relay-common (RN-common) search space and/or a relay-specific (RN-specific) search space. A basic unit of the R-PDCCH resources may be an RB (e.g. 12 consecutive subcarriers×7(6) consecutive OFDM symbols), a Resource Element Group (REG) (e.g. 4 available subcarriers×1 OFDM symbol), or a Control Channel Element (CCE) (e.g. a plurality of (for example, 9) REGs).

The R-PDCCH resources (i.e. the R-PDCCH search space) reserved by Signal #1 are wholly or partially used for a later actual transmission of an R-PDCCH. In most cases, only a part of the reserved R-PDCCH resources is used for R-PDCCH transmission. Meanwhile, an RN should share resources with a macro UE in the data region of a backhaul subframe (e.g. an MBSFN subframe). Therefore, it is preferred that the conventional LVRB/DVRB mapping rules are still applied to an RN like a macro UE, thereby maximizing the multiplexing efficiency of a frame. In this context, Signal #1 is configured based on the same signaling information as an LTE RA signaling configuration in order to reserve R-PDCCH resources (e.g. R-PDCCH RBs). Specifically, Signal #1 may provide VRB mapping scheme/allocation information. For example, Signal #1 may provide various VRB mapping scheme/allocation information illustrated in FIGS. 6 to 9. Preferably, Signal #1 may include information about contiguous VRBs (e.g. the start and length of the VRBs), as is done in DVRB allocation (refer to FIG. 9). Bit configuration in Signal #1 can use a format of resource allocation types 0, 1 and 2 used in the conventional LTE without modification, or use N bits bitmap when N VRBs are reserved for R-PDCCH in advance. VRB to PRB mapping can be carried out in accordance with resource allocation types 0, 1 and 2 of the conventional LTE. In particular, with the resource allocation types 0, 1 and 2-LVRB, VRB indexes are mapped to PRB indexes of same value, and with resource allocation type 2-DVRB, VRB indexes are distributed mapped to PRB indexes.

The number of R-PDCCH RBs reserved by Signal #1 is not limited to but is preferably a multiple of 4. Benefits that can be achieved from the number of R-PDCCH RBs being a multiple of 4 will be described later. A granularity for R-PDCCH resource allocation may be one RB, One RBG, or a group of X RBs (e.g. a group of 4 RBs), when needed. Preferably, the R-PDCCH resource allocation granularity is 4 RBs or a multiple of 4 RBs, which will be detailed later.

In the legacy LTE system, VRB allocation information (e.g. DVRB RA mapping signaling information) is transmitted only to one LTE UE. However, RA information (Signal

1) having the same configuration as or a similar configuration to the conventional VRB allocation information (e.g. the conventional DVRB RA mapping signaling information) may be transmitted to a plurality of (e.g. all) RNs and the RNs may determine the positions of R-PDCCH resources according to a conventional LTE RA rule (e.g. a DVRB interleaving rule) in an embodiment of the present invention (RN (group) common signaling). While not shown, Signal #1 may be transmitted only to one RN, as is conventionally done in the legacy LTE system (RN dedicated signaling).

When Signal #1 is transmitted through higher layer signaling on an R-PDSCH, there is no way for an RN to know a reserved resource area for an R-PDCCH during an initial access. Accordingly, the RN may assume the existence of an R-PDCCH in an RB with a specific RB index and decode the R-PDCCH during the initial access (a UE mode). Then, the RN may determine a resource area reserved for an R-PDCCH from Signal #1 received through higher layer signaling (e.g. RRC signaling) in a semi-static manner (an RN mode). However, if the reserved R-PDCCH area has been changed, the RN may not know the exact time when the reserved R-PDCCH has been changed. As a result, R-PDCCH decoding may be defective. Even though there is no problem with R-PDCCH decoding, the RN may have to attempt decoding to detect an R-PDCCH in many cases. To minimize this problem, the size of the reserved R-PDCCH area may be increased or decreased by one basic unit each time it is changed. Obviously, this information should be considered in determining the positions and number of R-PDCCH RBs included in semi-static RRC signaling. For instance, the reserved R-PDCCH area may be increased or decreased in size by a multiple of 4 RBs. In this case, the RN has to detect an R-PDCCH in an extra R-PDCCH area as well as an existing R-PDCCH area or in a decreased R-PDCCH area as well as the existing R-PDCCH area in the vicinity of a subframe having a changed R-PDCCH area (i.e. before or after the subframe), for example, after receiving RRC signaling. In this manner, decoding complexity caused by an arbitrary R-PDCCH RB configuration can be reduced.

Meanwhile, if the RN is capable of directly receiving an R-PDCCH, Signal #1 may be transmitted in DCI of an R-PDCCH (for example, in the case where a subframe boundary is a few symbols misaligned between the BS and the RN and thus the RN can receive an R-PDCCH directly). In this case, the RN can determine a resource area reserved for an R-PDCCH on a subframe basis.

Referring to FIG. 12 again, the BS transmits R-PDCCHs in a backhaul subframe (S1220). The R-PDCCHs may be transmitted in the whole or part of the R-PDCCH resources reserved by Signal #1 in step S1210. In most cases, only a part of M R-PDCCH RBs are used for R-PDCCH transmission. DCI mapped to R-PDCCH resources (e.g. R-PDCCH RBs), such as a DL grant (downlink scheduling information) and a UL grant (uplink scheduling information), may not be cross-interleaved. In this case, only a single R-PDCCH is transmitted in one or more RBs. The DCI mapped to the R-PDCCH resources may also be intra-RB interleaved. The DCI mapped to the R-PDCCH resources may also be inter-RB interleaved (cross-interleaved). In this case, a plurality of R-PDCCHs may be transmitted together in one or more RBs. Subsequently, each RN monitors the R-PDCCH resources (the R-PDCCH resource area) reserved by Signal #1 received in step S1210 to determine whether there is any R-PDCCH destined for the RN. Monitoring the R-PDCCH resources involves blind decoding of R-PDCCH candidates. Upon detection of its own R-PDCCH, an RN performs an operation according to the DCI of the R-PDCCH (e.g. downlink reception, uplink transmission, etc.).

It is regulated that an R-PDCCH carrying a DL grant (referred to as a DL grant R-PDCCH) is transmitted in the first slot of a subframe and an R-PDCCH carrying a UL grant (referred to as a UL grant R-PDCCH) is transmitted in the second slot of the subframe. Thus, if a DL grant R-PDCCH exists only in the first slot, the second slot may be wasted. Accordingly, an R-PDCCH is preferably transmitted in the second slot. In this regard, an R-PDSCH resource area allocated to a specific RN may be overlapped with an R-PDCCH resource area reserved for R-PDCCHs, for example, by RRC signaling. In this case, an RN (or a procedure) may be configured so as to acquire an R-PDSCH only from the second slot, for an overlapped RB. To increase resource utilization, an RN (or a procedure) may be configured such that an R-PDSCH is demodulated in the second slot, only for an RB carrying an R-PDCCH, and also in the first slot for an RB that does not carry an R-PDCCH. In this manner, the RN can determine the existence of a first R-PDCCH area and acquire an R-PDSCH from the remaining area, while still using conventional LTE RA, which will be described again.

With reference to FIGS. 13 to 17, methods for multiplexing R-PDCCHs with R-PDSCHs in resources allocated according to a DVRB scheme. For the sake of convenience, the R-PDCCHs and the R-PDSCHs are shown as transmitted in the first slot and in the first/second slot, respectively. However, the R-PDCCH and R-PDSCH transmission is exemplary. For instance, the R-PDCCHs may be transmitted on a slot basis in the first and/or second slot. In LTE-A, a DL grant R-PDCCH and a UL grant R-PDCCH are transmitted in the first and second slots, respectively. Unless otherwise specified, an RB may refer to a VRB or a PRB under circumstances.

Figure 13:
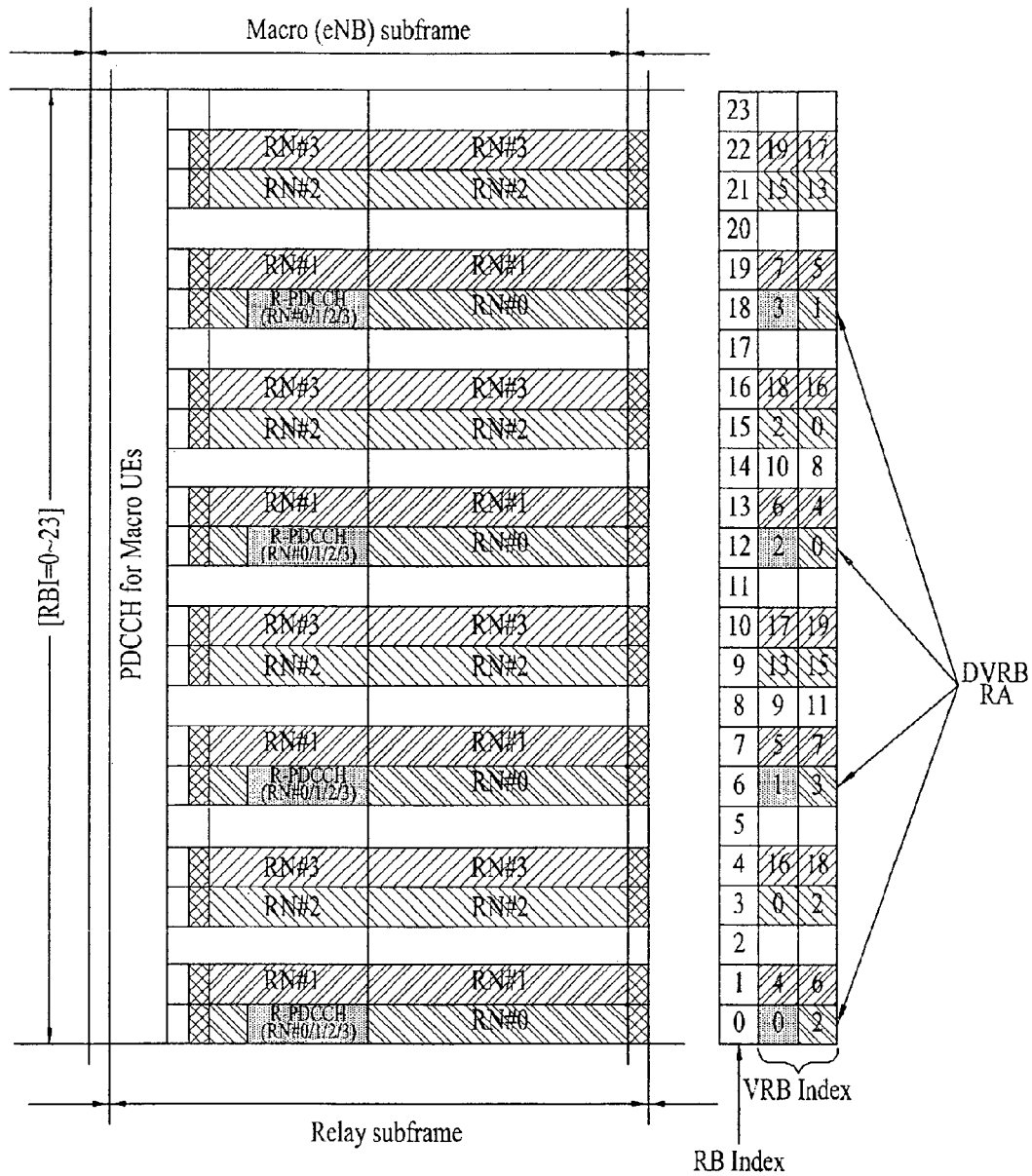
FIGS. 13 to 17 illustrate methods for multiplexing R-PDCCHs with R-PDSCHs in resources allocated according to a DVRB scheme according to embodiments of the present invention.

FIG. 13 illustrates a method for multiplexing R-PDCCHs with R-PDSCHs in 24 DVRBs, for four RNs. The four RNs may be a preset RN group scheduled to use the 24 allocated R-PDCCH RBs. That is, the illustrated R-PDCCH RBs may be dedicated to the RNs (or the RN group). Because slot-based cyclic shift (DVRB slot hopping) is adopted in the DVRB scheme, one RN is not allowed to use two slots of the same PRB. That is, an R-PDCCH (and an R-PDSCH) is not transmitted to an RN in the two slots of the same PRB. If the R-PDCCH/R-PDSCH is demodulated using a DeModulation-Reference Signal (DM-RS), the resulting degraded channel estimation performance leads to the degradation of demodulation performance. Considering that an R-PDCCH is transmitted in a good channel environment in most cases, it is preferred to allocate the two slots of the same PRB to the same RN (i.e. an R-PDCCH (and an R-PDSCH)). For this purpose, DVRB slot hopping may not be applied in DVRB-based R-PDCCH RA. Resources for an RN are allocated to the same VRB set in the first and second slots. The slot hopping-off may apply to all DVRB resources allocated by Signal #1 or to actual resources carrying R-PDCCHs.

As illustrated in FIG. 13, a basic VRB grouping unit for allocating DVRBs to an RN is a multiple of 4, VRB #0 to #3, VRB #4 to #7, VRB #12 to #15, or VRB #16 to #19 in an embodiment of the present invention. Resources for an RN are allocated to the same VRB set in the first and second slots. In spite of DVRB slot hopping, the same PRBs in two slots may be allocated to the same RN. That is, the same PRBs of two slots are available to transmission of an R-PDCCH (and an R-PDSCH) to the same RN through DVRB allocation.

Therefore, a basic resource allocation unit for an RN may be 4. For instance, 4 RBs may be a resource allocation unit for an RN in a situation where backhaul resources are allocated in both a distributed manner and a localized manner. Hence, a multiple of 4 RBs can be allocated to an RN. In this case, the number of bits required for an RA field may be reduced using an RB step (e.g. step=4). In addition, even though four RBs (e.g. VRB #0 to #3) are cyclically shifted in the second slot, each of the cyclically shifted RBs is adjacent to one of the four RBs in the first slot. Therefore, even though slot hopping is off only for M RBs (e.g. an R-PDCCH search space) reserved for R-PDCCH transmission, the M RBs do not interfere with other RBs to which slot hopping is applied. For the last VRB index, two VRBs may be paired, not four VRBs. Similarly to the above manner, resources for transmission of an R-PDCCH can be allocated to RN #1, RN #2 and RN #3.

Figure 14:
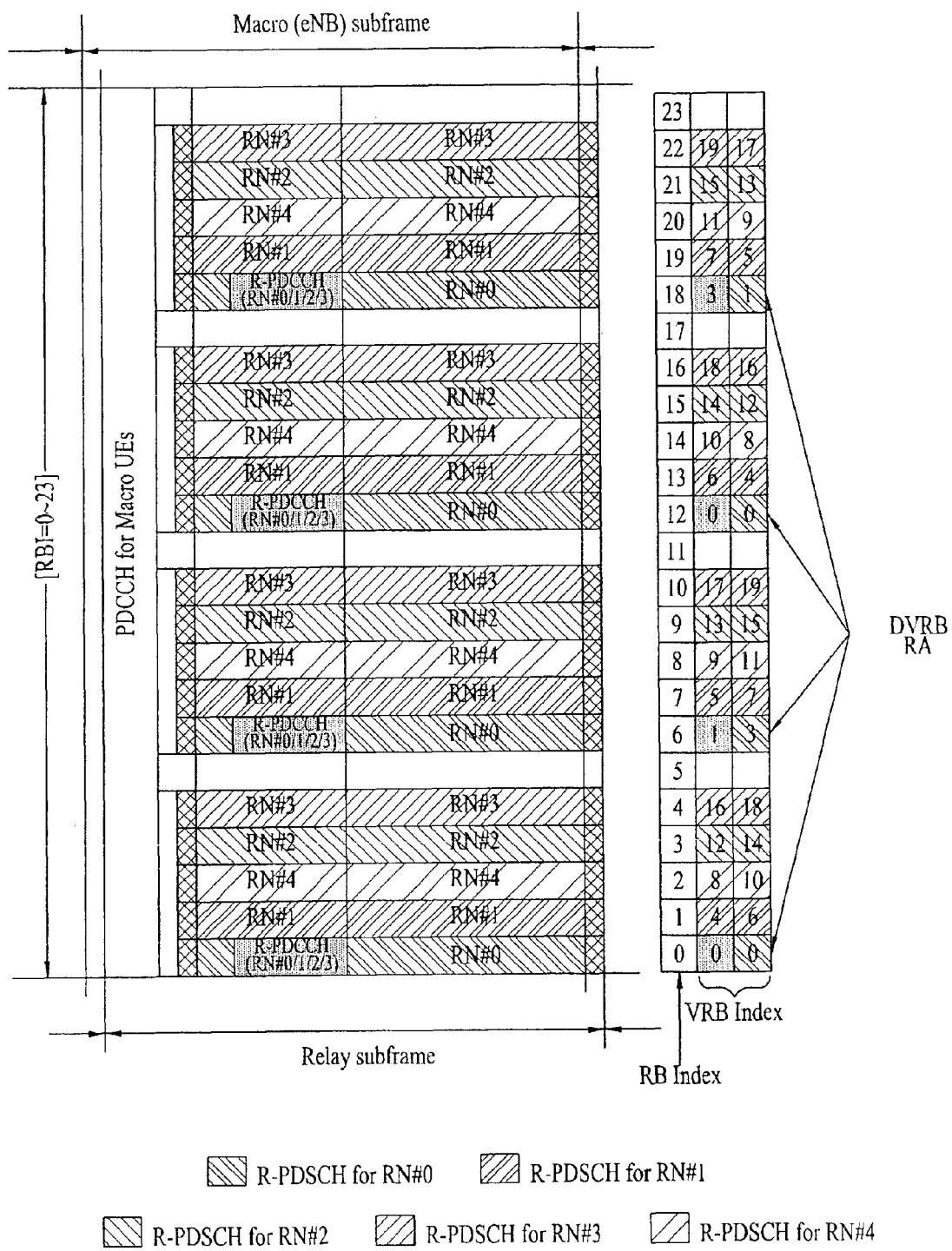

FIG. 14 illustrates another method for multiplexing R-PDCCHs with R-PDSCHs in resources allocated according to the DVRB scheme. Resources of a DVRB resource area assumed in FIG. 13 are allocated to an RN that does not belong to the RN group of FIG. 13. In this manner, resources allocated to the RN group can be efficiently utilized.

Referring to FIG. 13 again, an R-PDCCH for RN #4 is not interleaved in the R-PDCCH area (for RN #0 to RN#3) and thus RN #4 is from another RN group. Let RN #0 to RN#3 form RN Group #1. Then the resources (or resource area) of FIG. 13 are intended for RN Group #1. In this example, even though RN #4 is from another RN group, resources may be allocated to RN #4 for an R-PDCCH and/or an R-PDSCH in the resources of RN Group #1, thereby increasing resource use efficiency, as illustrated in FIG. 14. In this case, information indicating that the resources (area) are allocated to another RN (RN group) should be transmitted together with or separately from RA signaling information. In an embodiment of the present invention, a signal indicating an RN or an RN group (a Group Indication Signal (GIS)) may be transmitted. That is, the GIS and a DVRB signal may be used in allocating resources. The GIS may be inserted in an RA field or carried in a separate field. If the GIS does not change often, the GIS may be indicated by higher layer signaling (e.g. RRC signaling or MAC signaling).

Figure 15:
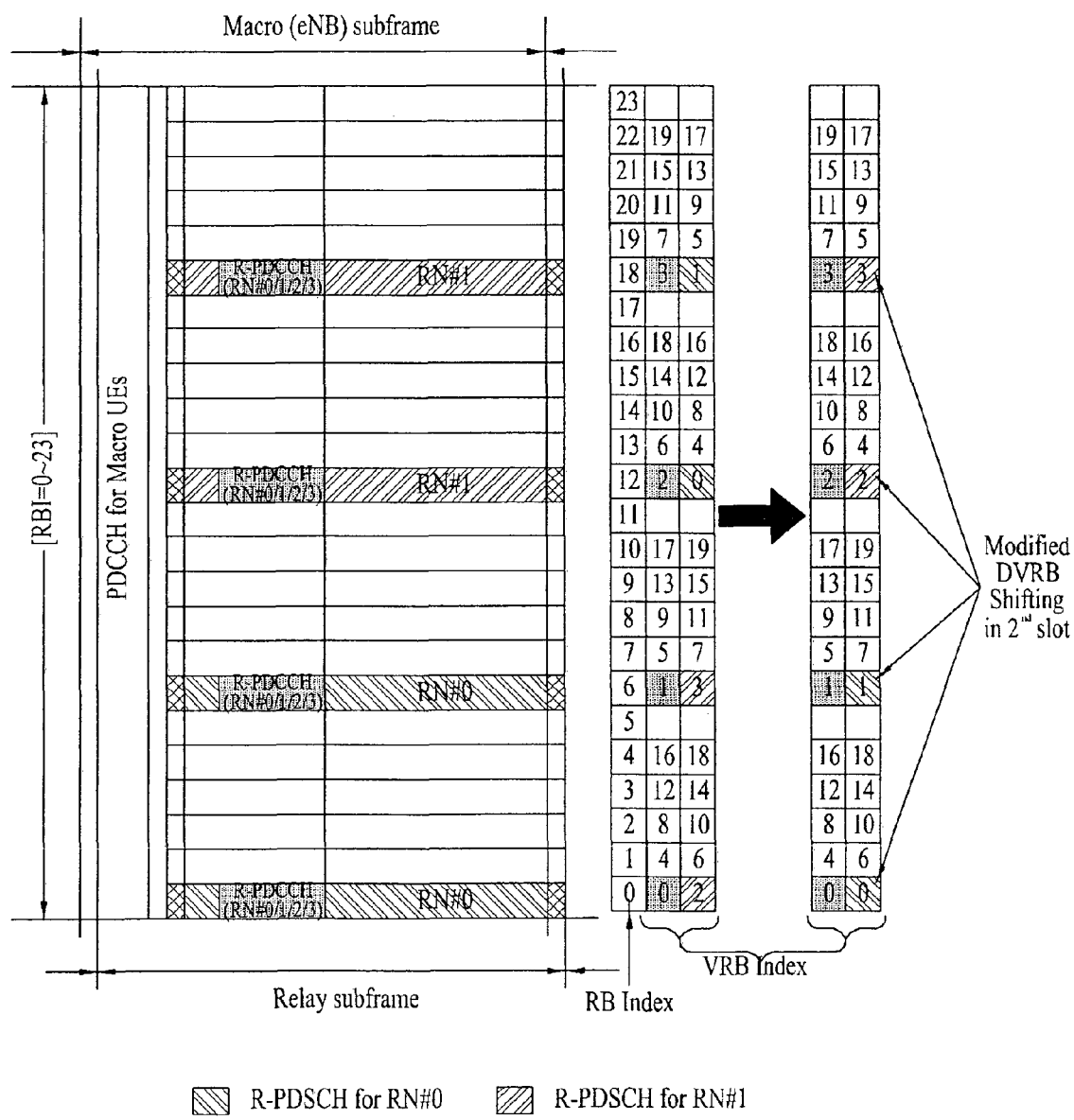

FIG. 15 illustrates a third method for multiplexing R-PDCCHs with R-PDSCHs in resources allocated according to the DVRB scheme. This method maximizes resource use efficiency by modifying a conventional RA.

Referring to FIG. 15, if RN #0 is paired with RN #1 and 4 RBs are configured for them, a common DVRB signal (PRB #0/6=VRB#0/1/2/3) may be transmitted to RN #0 and RN #1 to notify them of the allocated resource area and to instruct them not to follow LTE PDSCH DVRB mapping in the second slot. That is, the DVRB signal may be reconfigured so that the first and second slots of the same RB index are used without slot-based shifting. According to the conventional DVRB mapping rule, RB #0 in the first slot is cyclically shifted to RB #12 in the second slot according to a gap value. However, the cyclic shift may degrade channel estimation performance and thus demodulation performance, when an R-PDCCH/R-PDSCH is demodulated using a DM-RS.

Therefore, an RN may use the same RBs in the first and second slot without RB shifting in the second slot. For this operation, additional signaling may not be needed. A conventional operation mode and a proposed operation mode may be configured together. For example, shifting-off (i.e. slot hopping-off) is applicable only to RBs to which R-PDCCHs are actually allocated. Alternatively, shifting-off may be applied to all RBs of an R-PDCCH search space. For an R-PDSCH, shifting-off is applicable only when resources carrying an R-PDCCH are overlapped with resources indicated by the R-PDCCH. In addition, shifting-off is applicable only to RBs to which R-PDSCHs are actually allocated. Shifting-off may also be applicable to all RBs available to an RN in a backhaul subframe.

Figure 16:
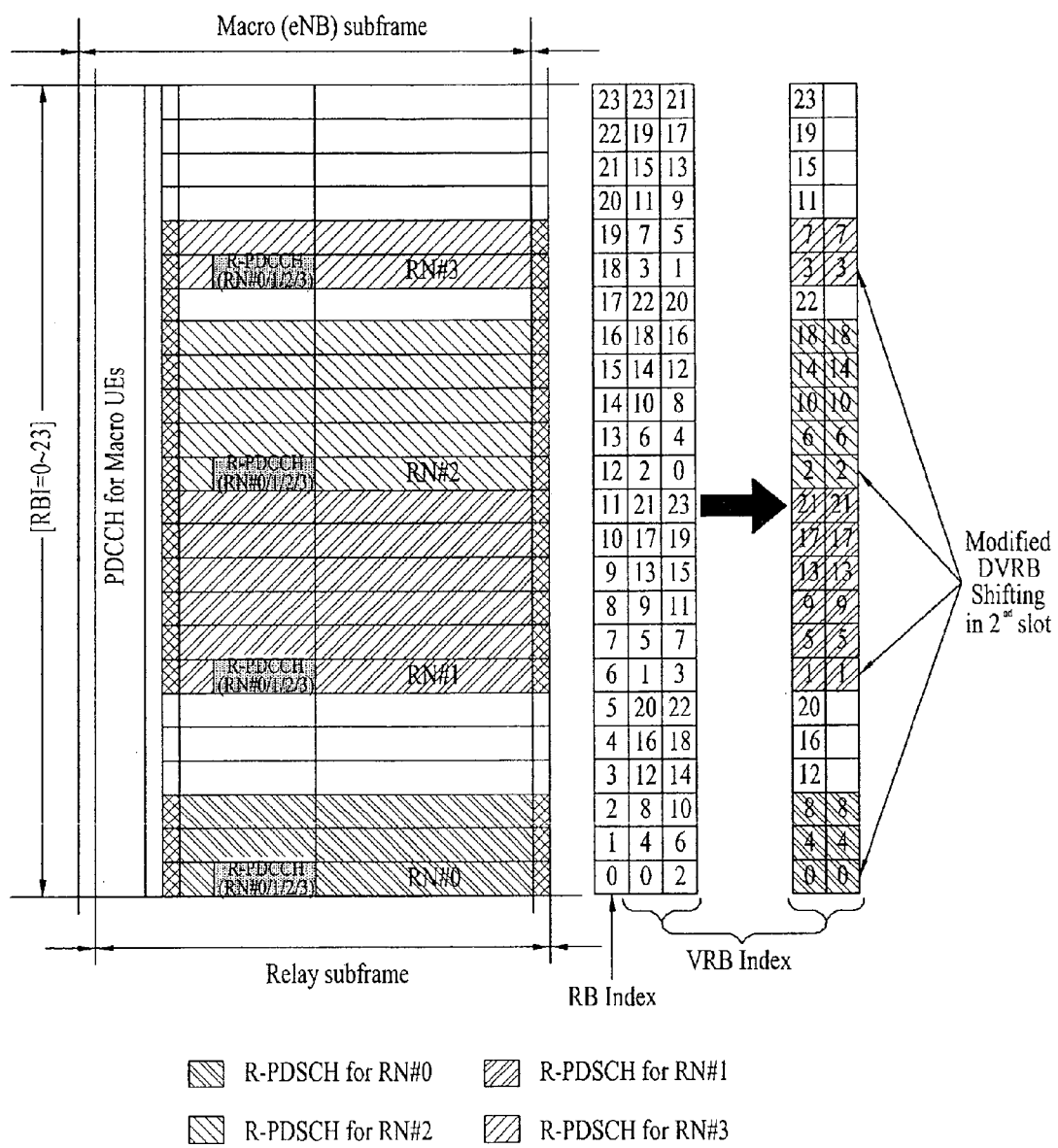

FIG. 16 illustrates a fourth method for multiplexing R-PDCCHs with R-PDSCHs in resources allocated according to the DVRB scheme.

Referring to FIG. 16, an R-PDCCH resource area is known to RNs and each RN monitors an R-PDCCH candidate area (i.e. an R-PDCCH search space) to detect its own R-PDCCH. In this method, an RN to use the second slot is determined according to the index of a Relay CCE (R-CCE) to which an R-PDCCH is allocated for RN #k (k=0, 1, 2, 3). For example, this method may be carried out based on an R-CCE-index to RB-index mapping rule which is not restricted to a specific one. For example, the second slot of an RB carrying an R-PDCCH may be mapped to an RN corresponding to the R-PDCCH. To be more specific, if an R-CCE for an R-PDCCH of RN #0 is mapped to RB #0, an R-CCE for an R-PDCCH of RN #1 is mapped to RB #6, an R-CCE for an R-PDCCH of RN #2 is mapped to RB #12, and an R-CCE for an R-PDCCH of RN #3 is mapped to RB #18, the second slots of RB #0, 6, 12 and 18 may be mapped to RN #0, 1, 2, and 3, respectively. Thus, R-PDSCHs and R-PDCCHs are allocated as illustrated in FIG. 16.

According to the above description, it is possible to allocate the resources of the second slot of an RB carrying an R-PDCCH for an RN to the RN (e.g. for an R-PDSCH) without additional signaling (implicit signaling). The remaining RBs carrying R-PDSCHs may be allocated to RNs by RA included in R-PDCCHs. In this case, an RN may be configured so as to demodulate an R-PDSCH by distinguishing RBs carrying R-PDCCHs from RBs that does not carry R-PDCCHs. For this purpose, the first slot of all RBs (an R-PDCCH search space) reserved for R-PDCCHs may be excluded from R-PDSCH transmission (or R-PDSCH demodulation). In another method, an RN may exclude only the first slot of an RB from which its own R-PDCCH (it may be restricted to a DL grant R-PDCCH) is detected from R-PDSCH transmission (or R-PDSCH demodulation). Specifically, when the RN detects at least part of a DL grant R-PDCCH in the first slot of a PRB, the RN may exclude the first slot of the PRB in R-PDSCH demodulation. In a further method, an RB carrying an R-PDCCH may be indicated explicitly.

Figure 17:
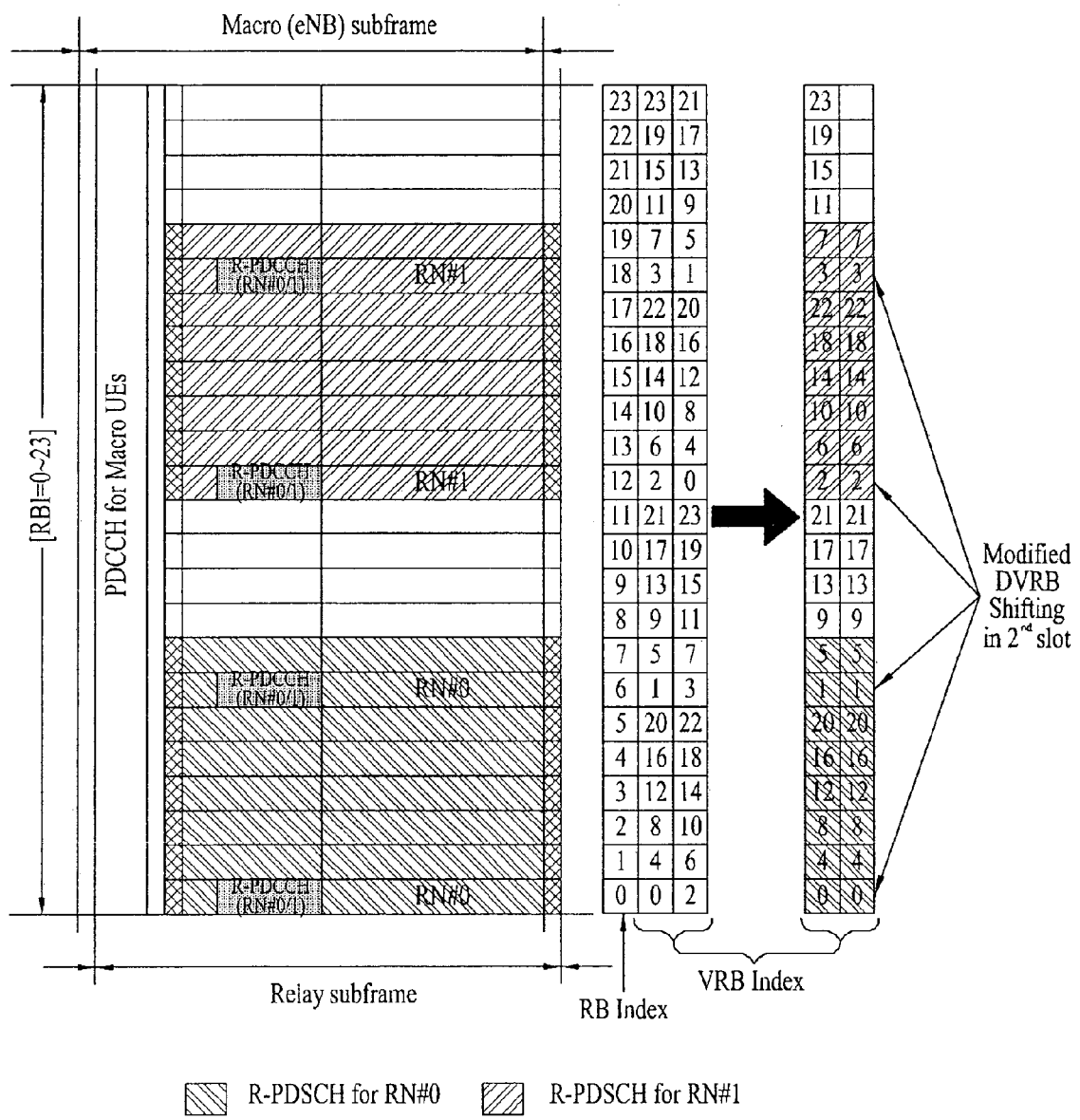

FIG. 17 illustrates an extension of FIG. 16. Therefore, it is assumed that the second slot of an RB carrying an R-PDCCH is implicitly mapped to an RN corresponding to the R-PDCCH as in FIG. 16. In this case, if there are a small number of RBs carrying R-PDCCHs due to a small number of RNs, some RBs may not be allocated in the second slot, thus wasting resources. This resource waste may be prevented by increasing a CCE aggregation level.

Referring to FIG. 17, if there are only R-PDCCHs for two RNs in an R-PDCCH resource area (e.g. 4 RBs), the R-PDCCHs of the two RNs may be transmitted over the four RBs by increasing an R-PDCCH R-CCE aggregation level. For this purpose, a CCE-to-RB mapping rule may be used. The CCE-to-RB mapping rule is not limited to a specific one. For instance, R-CCE #0 may be mapped to RB #0, R-CCE #1 may be mapped to RB #6, R-CCE #2 may be mapped to RB #12, and R-CCE #3 may be mapped to RB #18. On the assumption of four R-CCEs for four RBs (i.e. one R-CCE per RB), R-CCE #0 and #1 may be mapped to RN #0 and R-CCE #2 and #3 may be mapped to RN #1 (a CCE aggregation level=2). Thus an R-PDSCH for an RN may be allocated implicitly so as to include one or more R-PDCCH transmission areas. In the illustrated case of FIG. 17, the second slots of RB#0 and RB#6 are implicitly allocated to RN #0 (for an R-PDSCH), and the second slots of RB#12 and RB#18 are implicitly allocated to RN #1 (for an R-PDSCH).

Figure 18:
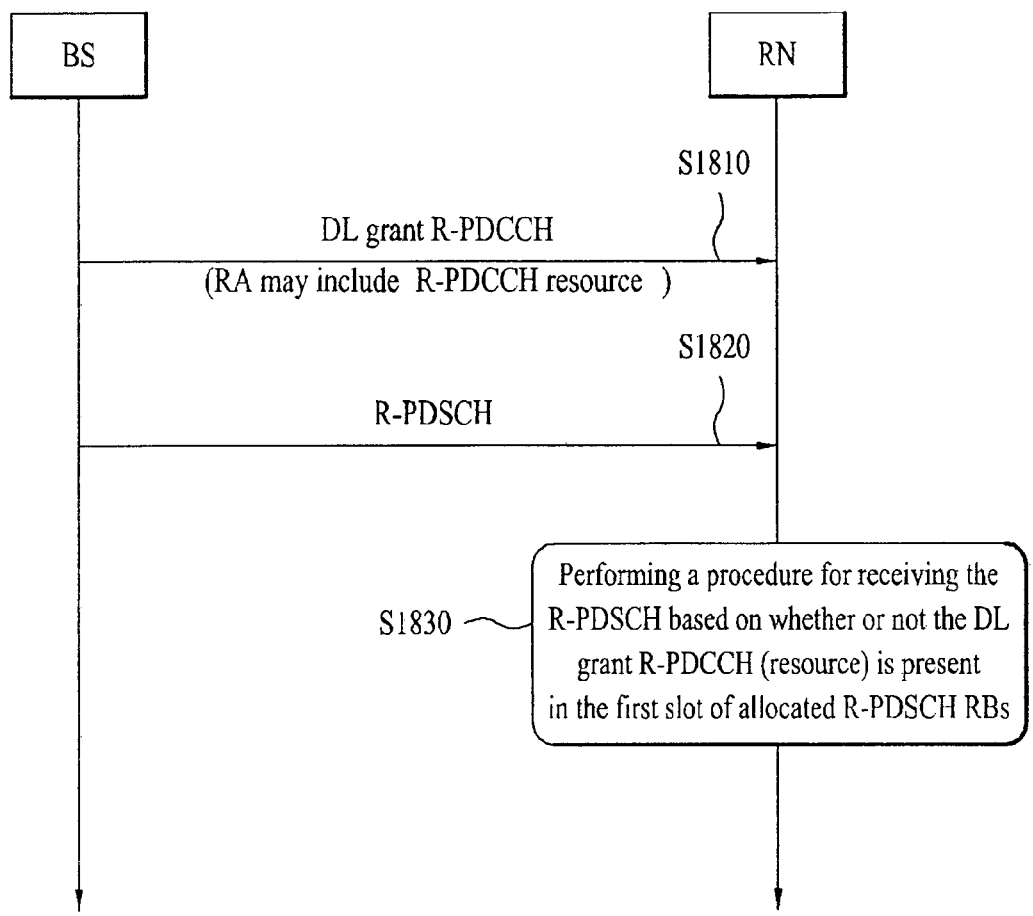
FIG. 18 illustrates a method for allocating an R-PDSCH and decoding and demodulating the R-PDSCH according to an embodiment of the present invention.

FIG. 18 illustrates a method for allocating an R-PDSCH and decoding and demodulating the R-PDSCH. This method does not use implicit mapping between R-CCE indexes and RB indexes illustrated in FIGS. 16 and 17.

Referring to FIG. 18, a BS transmits a DL grant R-PDCCH to an RN (S1810). The DL grant R-PDCCH contains R-PDSCH RA information. Then the BS transmits an R-PDSCH to the RN (S1820). R-PDSCH RA information indicates resources of 1st slot only. Therefore, if R-PDCCH is transmitted via 1st slot of a PRB pair and R-PDSCH is transmitted via 2nd slot of the PRB pair, resources indicated by the R-PDSCH RA information may include one or more PRB resource on which R-PDCCH is transmitted. Therefore the RN performs an R-PDSCH reception operation by checking whether the first slot of an allocated R-PDSCH RB includes an R-PDCCH (i.e. R-PDCCH resources) (S1830). The R-PDSCH reception involves R-PDSCH decoding/demodulation.

S1830 will be detailed below. While the following method is described, centering on an RN, for the sake of convenience, an operation corresponding to the method should also be defined for a BS. That is, S1820 and S1830 are configured in relation to each other.

In one decoding/demodulation method, the RN may decode/demodulate the R-PDSCH, considering that the first slot of all RBs reserved for R-PDCCHs (i.e. an R-PDCCH search space) does not include an R-PDSCH. Because all resources allocated semi-statically for R-PDCCHs (e.g. RRC configured R-PDCCH resources) are signaled to the RN, the RN can determine the positions of the resources. Notably, a drawback of this method lies in that despite no transmission of R-PDCCHs in a specific resource area, R-PDCCHs are regarded as transmitted in the resource area and thus the resource area is not used for R-PDSCH transmission (a conservative method).

Another decoding/demodulation method is that the RN considers that an R-PDCCH exists only in the first slot of an RB carrying at least part of its own R-PDCCH (it may be restricted to a DL grant R-PDCCH) (as a result of interleaving) during R-PDCCH decoding/demodulation. That is, the RN determines that an R-PDSCH is transmitted only in the second slot of an RB from which an R-PDCCH is detected and an R-PDSCH is transmitted also in the first slot of other R-PDSCH scheduled RBs. Notably, each RN does not have knowledge of RBs carrying R-PDCCHs for other RNs and thus does not know the resulting effects. However, this problem may be solved by imposing a constraint on a scheduler. Specifically, the scheduler may allow one of RNs to which a part of an R-PDCCH is transmitted in the first slot of a specific RB to be allocated an R-PDSCH in the second slot of the specific RB. In addition, the scheduler may operate such that an R-PDCCH directed to another RN is not included in an R-PDSCH scheduled RB area other than an RB carrying a part of an R-PDCCH to an RN. These are scheduler implementation issues. The RN should know that it has to perform the above decoding/demodulation procedure. Accordingly, associated functions should be contained in implementing an RN (or a procedure), which should be clarified in any way (a semi-implicit method).

A third decoding/demodulation method is that an RB carrying an R-PDCCH is explicitly indicated to each RN. That is, RBs whose first slot is used for actual R-PDCCH transmission among RBs carrying R-PDSCHs may be notified. Since the number of RBs to be indicated may vary, a signaling format indicating the RBs may also vary.

Figure 19:
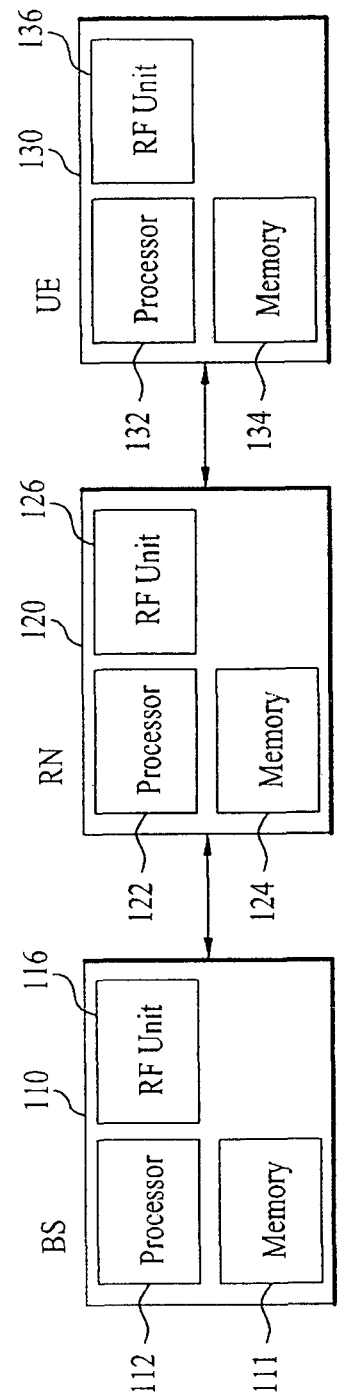
FIG. 19 is a block diagram of a Base Station (BS), a Relay Node (RN), and a User Equipment (UE) that are applicable to the present invention.

FIG. 19 is a block diagram of a BS, a relay and a UE which are applicable to the present invention.

Referring to FIG. 19, a wireless communication system includes a BS 110, an RN 120, and a UE 130.

The BS 110 includes a processor 112, a memory 114, and an RF unit 116. The processor 112 may be configured so as to implement the procedures and/or methods of the present invention. The memory 114 is connected to the processor 112 and stores various pieces of information related to operations of the processor 112. The RF unit 116 is connected to the processor 112 and transmits and/or receives RF signals. The relay 120 includes a processor 122, a memory 124, and an RF unit 126. The processor 122 may be configured so as to implement the procedures and/or methods of the present invention. The memory 124 is connected to the processor 122 and stores various pieces of information related to operations of the processor 122. The RF unit 126 is connected to the processor 122 and transmits and/or receives RF signals. The UE 130 includes a processor 132, a memory 134, and an RF unit 136. The processor 132 may be configured so as to implement the procedures and/or methods of the present invention. The memory 134 is connected to the processor 132 and stores various pieces of information related to operations of the processor 132. The RF unit 136 is connected to the processor 132 and transmits and/or receives RF signals. The BS 110, the relay 120 and/or the UE 130 may have a single or multiple antennas.

INDUSTRIAL APPLICABILITY

The present invention relates to a wireless communication system. Particularly, the present invention is applicable to a method and apparatus for allocating resources for a physical channel to a relay.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method of receiving downlink signal at a relay in a wireless communication system, the method comprising:
receiving resource allocation information indicating a Virtual Resource Block (VRB) set through an Radio Resource Control (RRC) signaling;
receiving a downlink subframe, starting from a specific Orthogonal Frequency Division Multiplexing (OFDM) symbol other than first OFDM symbol of the downlink subframe;
monitoring at least part of the VRB set in the downlink subframe for an Relay Physical Downlink Control Channel (R-PDCCH); and
performing an operation according to the Downlink Control Information (DCI) of the R-PDCCH.

2. The method of claim 1, wherein the R-PDCCH is not interleaved.

3. The method of claim 2, wherein the VRB set includes one or more distributed VRBs (DVRBs).

4. The method of claim 3, wherein the one or more DVRBs are distributed to one or more Physical Resource Blocks (PRBs) in first slot of the downlink subframe, and the one or more DVRBs are distributed to one or more PRBs in second slot of the downlink subframe,
wherein the distribution to the one or more PRBs in the second slot is configured to have identical PRB indexe(s) with the one or more PRBs in the first slot.

5. The method of claim 1, wherein the VRB set includes a plurality of R-PDCCH candidates, and an R-PDCCH designated to the relay is masked by a Radio Network Temporary Identity (RNTI) related with the relay.

6. The method of claim 1, wherein the downlink subframe is received from third OFDM symbol.

7. A relay used in a wireless communication system, the relay comprising:
a Radio Frequency (RF) unit; and
a processor,
wherein the processor is configured:
to receive resource allocation information indicating a Virtual Resource Block (VRB) set through an Radio Resource Control (RRC) signaling,
to receive a downlink subframe, starting from a specific Orthogonal Frequency Division Multiplexing (OFDM) symbol other than first OFDM symbol of the downlink subframe,
to monitor at least part of the VRB set in the downlink subframe for an Relay Physical Downlink Control Channel (R-PDCCH), and
to perform an operation according to the Downlink Control Information (DCI) of the R-PDCCH.

8. The relay of claim 7, wherein the R-PDCCH is not interleaved.

9. The relay of claim 8, wherein the VRB set includes one or more distributed VRBs (DVRBs).

10. The relay of claim 9, wherein the one or more DVRBs are distributed to one or more Physical Resource Blocks (PRBs) in first slot of the downlink subframe, and the one or more DVRBs are distributed to one or more PRBs in second slot of the downlink subframe,
wherein the distribution to the one or more PRBs in the second slot is configured to have identical PRB indexe(s) with the one or more PRBs in the first slot.

11. The relay of claim 7, wherein the VRB set includes a plurality of R-PDCCH candidates, and an R-PDCCH designated to the relay is masked by a Radio Network Temporary Identity (RNTI) related with the relay.

12. The relay of claim 7, wherein the downlink subframe is received from third OFDM symbol.

13. A method for processing downlink signal at a relay in a wireless communication system, the method comprising:
receiving a physical control channel signal including downlink resource allocation in first slot of a downlink subframe; and
performing an operation for receiving a physical shared channel signal by using the downlink resource allocation,
wherein if resources indicated by the downlink resource allocation information overlap with a resource block pair where the physical control channel signal is detected, the first slot of the resource block pair is excluded from the operation for receiving the physical shared channel signal.

14. The method of claim 13, wherein the physical control channel signal includes a Relay Physical Downlink Control channel (R-PDCCH) signal and the physical shared channel signal includes a Physical Downlink Shared Channel (PDSCH) signal.

15. The method of claim 13, wherein the resource block pair includes a Physical Resource Block (PRB) pair.

16. The method of claim 13, wherein the physical control channel signal is interleaved in a plurality of resource blocks.

17. A relay used in a wireless communication system, the relay comprising:
a Radio Frequency (RF) unit; and
a processor,
wherein the processor is configured:
to receive a physical control channel signal including downlink resource allocation in first slot of a downlink subframe, and
to perform an operation for receiving a physical shared channel signal by using the downlink resource allocation,
wherein if resources indicated by the downlink resource allocation information overlap with a resource block pair where the physical control channel signal is detected, the first slot of the resource block pair is excluded from the operation for receiving the physical shared channel signal.

18. The relay of claim 17, wherein the physical control channel signal includes a Relay Physical Downlink Control channel (R-PDCCH) signal and the physical shared channel signal includes a Physical Downlink Shared Channel (PD-SCH) signal.

19. The relay of claim 17, wherein the resource block pair includes a Physical Resource Block (PRB) pair.

20. The relay of claim 17, wherein the physical control channel signal is interleaved in a plurality of resource blocks.

* * * * *